(12) United States Patent
Kandukuri et al.

(10) Patent No.: US 10,990,594 B2
(45) Date of Patent: Apr. 27, 2021

(54) METHOD FOR FAST AND CONSISTENT INVOCATION OF CONCURRENTLY MODIFIABLE USER-DEFINED FUNCTIONS

(71) Applicant: Oracle International Corporation, Redwood Shores, CA (US)

(72) Inventors: Anantha Kiran Kandukuri, Zurich (CH); Laurent Daynes, Grenoble (FR); Hassan Chafi, San Mateo, CA (US)

(73) Assignee: Oracle International Corporation, Redwood Shores, CA (US)

( * ) Notice: Subject to any disclaimer, the term of this patent is extended or adjusted under 35 U.S.C. 154(b) by 147 days.

(21) Appl. No.: 15/971,664

(22) Filed: May 4, 2018

(65) Prior Publication Data
US 2019/0340284 A1 Nov. 7, 2019

(51) Int. Cl.
*G06F 8/70* (2018.01)
*G06F 16/23* (2019.01)
*G06F 16/2453* (2019.01)
*G06F 16/2455* (2019.01)

(52) U.S. Cl.
CPC .... *G06F 16/24542* (2019.01); *G06F 16/2343* (2019.01); *G06F 16/2455* (2019.01); *G06F 8/70* (2013.01)

(58) Field of Classification Search
CPC .......... G06F 16/24542; G06F 16/2343; G06F 16/2455; G06F 8/70; G06F 9/44521; G06F 8/36; G06F 16/24535
See application file for complete search history.

(56) References Cited

U.S. PATENT DOCUMENTS

| | | | | |
|---|---|---|---|---|
| 5,594,899 A | * | 1/1997 | Knudsen | G06F 8/31 |
| 5,596,752 A | * | 1/1997 | Knudsen | G06F 8/31 717/117 |
| 8,631,489 B2 | * | 1/2014 | Antonakakis | H04L 61/1511 709/223 |
| 9,454,344 B1 | * | 9/2016 | Gao | G06F 16/00 |

(Continued)

OTHER PUBLICATIONS

Wimmer, Christian, Oracle, "One VM to Rule Them All", VM Research Group, Oracle Labs, dated 2016, 130 pages.
Github, "Writing a Language in Truffle. Part 1: A Simple, Slow Interpreter", dated Oct. 13, 2014, 17 pages.
Franklin, Christopher, "A Guide to Java 9 Modularity", https://www.baeldung.com/java-9-modularity, dated May 12, 2019, 14 pages.
Fehrenbach, Stefan, "Just-in-time Compilation for Generalized Parsing", dated Sep. 1, 2014, 41 pages.

(Continued)

*Primary Examiner* — Jorge A Casanova
(74) *Attorney, Agent, or Firm* — Hickman Becker Bingham Ledesma LLP

(57) ABSTRACT

Database techniques are provided that use state machines to manage polyglot subroutine bindings for database commands. In an embodiment, a computer receives a database command that contains call sites (CSs). Each CS is associated with a user defined logic (UDL). The computer associates an initial operational state with each of the CSs. During a first invocation of a particular CS, the CS becomes initialized and transitions to an optimized state that is configured for streamlined invocation of the UDL. The UDL is invoked to contribute data to a partial result for the database command. Eventually, command execution stalls and causes the CS to transition to an unready state, which entails releasing shared resources. Later execution resumes and during another invocation of the CS, resources are reacquired, the CS is made ready and transitioned back to the optimized state. The CS may again be repeatedly invoked while revisiting the optimized state.

38 Claims, 11 Drawing Sheets

(56) References Cited

U.S. PATENT DOCUMENTS

| | | | |
|---|---|---|---|
| 2006/0248285 A1* | 11/2006 | Petev | G06F 12/084 |
| | | | 711/141 |
| 2007/0038662 A1 | 2/2007 | Bendel et al. | |
| 2007/0220020 A1 | 9/2007 | Goto | |
| 2013/0066837 A1* | 3/2013 | Colrain | G06F 16/2365 |
| | | | 707/674 |
| 2013/0263116 A1 | 10/2013 | Haupt et al. | |
| 2014/0337276 A1* | 11/2014 | Iordanov | G06F 16/2365 |
| | | | 707/602 |
| 2016/0078041 A1* | 3/2016 | Hartig | G06F 16/24 |
| | | | 707/696 |
| 2017/0286272 A1* | 10/2017 | Yang | G06F 11/3668 |
| 2017/0286273 A1* | 10/2017 | Lau | G06F 11/3664 |
| 2017/0308565 A1* | 10/2017 | Broll | G06F 16/2343 |
| 2019/0065552 A1 | 2/2019 | Brantner et al. | |

OTHER PUBLICATIONS

Oracle Database MLE Documentation, http://www.oracle.com/technetwork/database/multilingual-engine/documentation/index.html, dated 2017, 2 pages.

Oracle Database MLE 0.2.7, Oracle Database Multingual Engine (MLE), https://oracle.github.io/oracle-db-mle/releases/0.2.7/, dated 2017, 5 pages.

Hassan Chafi et al., "ManagingtheProliferationProblem", OracleLabsperspectiveonlanguage-integratedquerying & data analytics, dated Feb. 2017, 23 pages.

An Oracle White Paper, "Unleash the Power of Java Stored Procedures", Dated Jun. 2002, 20 pages.

* cited by examiner

METHOD FOR FAST AND CONSISTENT INVOCATION OF CONCURRENTLY MODIFIABLE USER-DEFINED FUNCTIONS

FIELD OF THE DISCLOSURE

This disclosure relates to database command processing. Presented herein are techniques for using state machines to manage polyglot subroutine bindings for long-running database commands.

BACKGROUND

A database application may define complex logic that is inefficient or impossible to express in a declarative query language, such as standard query language (SQL). Such complex logic may need the flexibility of a programming language that is procedural and/or functional, such as a general purpose programming language or a domain specific language (DSL). Execution of complex logic that more or less directly interacts with a database is most efficiently executed at the database by a database management system (DBMS) to avoid expensive interactions (e.g. network round trips) between a database server and a client. Thus, a DBMS may be equipped with programming language(s) that allow an application developer to store a program (e.g. one or more scripts) in the database for execution by the DBMS. Oracle PL/SQL is an example of a database server-side programming language, but increasingly, more programming languages are being supported by DBMSs, such as Java, but also more recent programming languages, such as JavaScript or Python.

Database server-side programs fall typically in two categories: stored procedures, which define entry points for a client and coordinate the execution of query(s); and user-defined extensions (UDEs), which express user-defined logic that can be used (e.g. invoked) directly in queries. Examples of the latter include user-defined functions (UDFs), which can be used in SQL expressions (e.g. for selection or projection), user-defined aggregation (UDAs) that summarize multiple rows, or a table function that generates rows.

Both stored procedures and UDEs are stored in the database and can be concurrently (i.e. asynchronously) modified at any time, although in practice, this is expected to be a rare event for programs deployed in a production database. A database system must nevertheless provide synchronization mechanisms for preserving the consistency of program definitions stored in the database, such as in a data dictionary. Unfortunately, UDEs and their synchronization mechanisms may be executed very frequently (e.g. one or more times for each of thousands or millions of rows) per executing query.

Workload concurrency may arise from multiple more or less simultaneous database commands or activities. Stored procedures and UDFs can be used and cached for multiple client sessions and executed in parallel. Such subroutines may also be concurrently modified, which causes two problems: how to efficiently invoke a UDF for a query, and how to guarantee consistent evaluation of the query. There is a design tension inherent to those two problems, such that alleviating one concern may aggravate the other. Furthermore, these concerns have scalability implications that may penalize overhead imposed by a solution.

DETAILED DESCRIPTION

Figure 1:
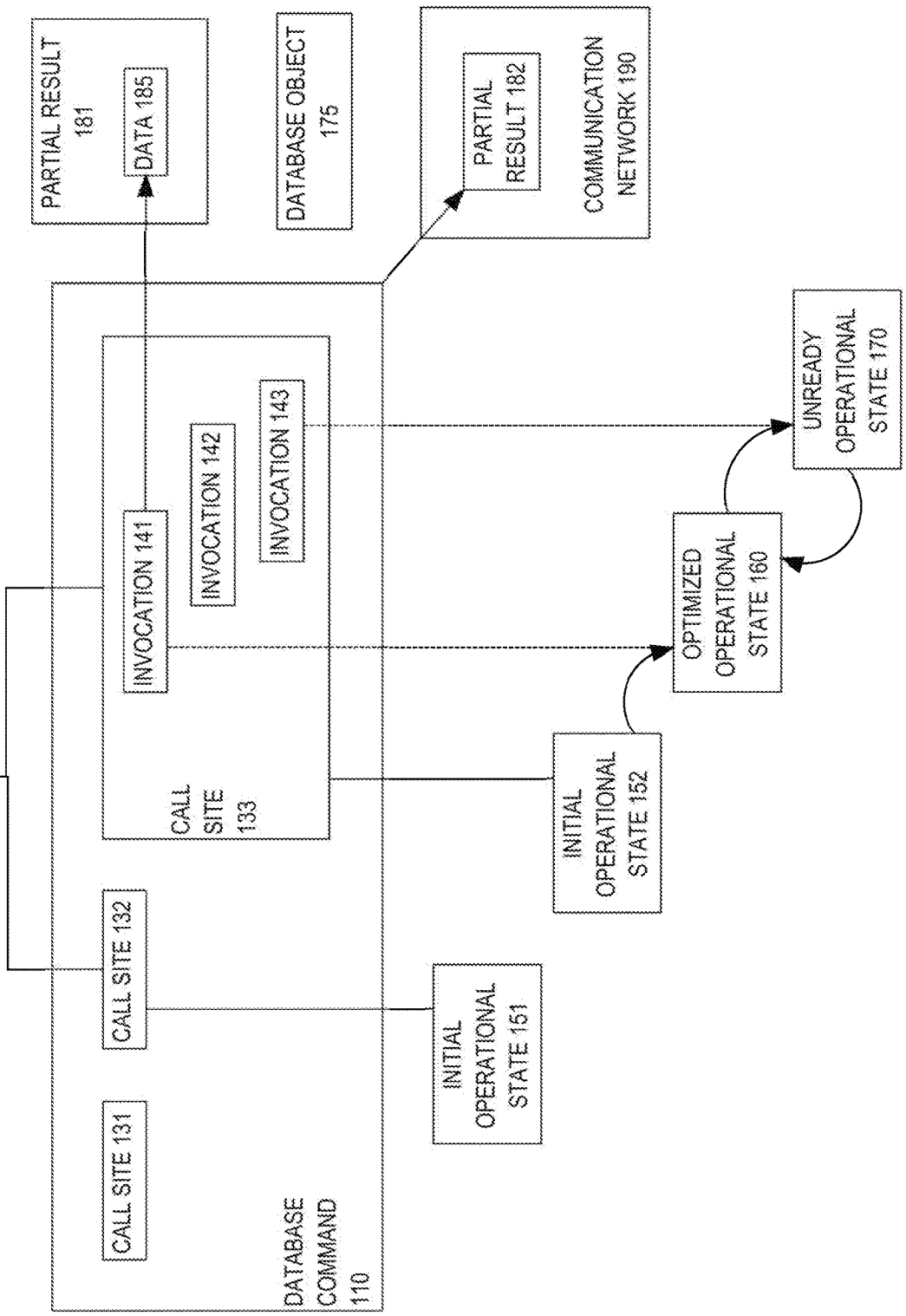
FIG. 1 is a block diagram that depicts an example computer system that uses a state machine to manage a long-running database command, in an embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are Described herein According to the Following Outline:

1.0 General Overview
    2.0 Example Computer System
        2.1 Throughput Volatility
        2.2 Call Site
        2.3 Lifecycle
        2.4 Stalling
        2.5 Resumption
    3.0 Example Call Site Management Process
        3.1 Preparation
        3.2 Streamlining
        3.3 Suspension
        3.4 Resumption
    4.0 Example State Machine Implementation
        4.1 Binding Stub
        4.2 Polyglot Optimization 5.0 Resource Coordination
5.1 Pessimistic Locking
5.2 Resource Inventory
6.0 Call Site Context and Cursor Sharing
7.0 Example Data Structures
8.0 Example Query Execution Process
9.0 Row Processing
10.0 Grouping
11.0 Database Overview
11.1 Query Processing
12.0 Hardware Overview
13.0 Software Overview
14.0 Cloud Computing 1.0 General Overview Database techniques are provided for using state machines to manage polyglot subroutine bindings for long-running database commands. Here, long running means that for various reasons, execution of a database command may temporarily stall and eventually resume. Each subroutine call site within the database command may have a state machine that is designed to increase throughput, detect race conditions, and avoid priority inversion, even though those opposing design goals may seem somewhat irreconcilable. As such, the state machine improves the performance of a database computer, including accelerating (i.e. saving time of) and saving energy of the computer.

In an embodiment, a computer receives a database command that contains one or more call sites, wherein each call site of the one or more call sites is associated with a user defined logic. A call site may be associated with an entry point in a package or module that may be defined in a same language as the database command or a different language. For example, a call site may be an invocation of a subroutine such as a user defined function (UDF). In an embodiment, the call site is represented in a parse tree and/or an execution plan of the database command. State management of a call site may occur as follows.

The computer associates an initial operational state with each of the call sites. During a first invocation of a particular call site that is associated with an initial operational state the call site becomes initialized and transitions to an optimized state that is configured for streamlined invocation of the user defined logic. The user defined logic is (e.g. repeatedly) invoked to generate data to be included in a first partial result for the database command, after which query execution eventually stalls, such as for flushing the first partial result back to a client. Stalling causes the call site to transition to an unready state, which includes releasing one or more shared database objects. Eventually query execution resumes, and during a next invocation of the call site, shared resources are reacquired and the call site is made ready and transitioned back to the optimized state. The call site may again be repeatedly invoked while revisiting the optimized state.

2.0 Example Computer System

FIG. 1 is a block diagram that depicts an example computer system 100, in an embodiment. Computer system 100 uses a state machine to manage a long-running database command. Computer system 100 contains communication network 190 that may be a bus such as in a system on a chip (SoC), a backplane such as in a computer cluster, a local area network (LAN), or an internetwork of networks such as the global Internet. Computer system 100 may be a distributed system having multiple computers (not shown) that intercommunicate over communication network 190.

In an embodiment, computer system 100 includes a database management system (DBMS) (not shown) that may process database command 110. Database command 110 may be a query or statement to read or write database data or metadata. In an embodiment, database command 110 is expressed in a language such as data manipulation language (DML), data definition language (DDL), or standard query language (SQL).

2.1 Throughput Volatility

In an embodiment, computer system 100 has a client computer that submits database command 110 for execution by a server computer. Communication network 190 and/or other data paths such as a bus, a backplane, disk rotation, disk head repositioning/seeking, solid state drive (SSD) wear maintenance, a network file system (NFS), network attached storage (NAS), RAID rebuilding, virtual memory swapping, or context switching such as multithreading may introduce latency (e.g. idling) during processing of database command 110. Regardless of which mechanism causes latency, monopolization of shared database resources during idleness should be avoided. For example, computer system 100 may simultaneously process multiple database commands from multiple clients, from which a backlog of demand may arise when shared resources are momentarily allocated to database command 110.

Retention of a shared resource, such as database object 175, by an idle process may reduce the throughput of computer system 100 and/or cause priority inversion. Database object 175 may be an object that is defined within a database schema, such as a UDF or a table, or a non-schematic object such as a lock. Kinds of database object 175 are elaborated later herein. Computer system 100 may release database object 175 when execution of database command 110 stalls. In an embodiment, shared resources are released when an operating system process or thread for database command 110 enters an IOWAIT scheduling state, such as defined by the portable operating system interface (POSIX), such as for network or disk input/output (I/O). Occurrence of stall(s) causes execution of database command 110 to be divided into serial bursts of processing. Each uninterrupted span of processing may produce a partial result, such as 181-182, towards fulfillment of database command 110.

2.2 Call Site

Data processing by repetition is a natural consequence of a bulk datastore. Repetition may manifest as sequential iteration or data parallelism. In either case, processing indicated by database command 110 may be repeated, such as for each data item in a datastore. For example, execution of database command 110 may perform a scan of either a relational table or a column vector. Database command 110 includes call sites 131-133 that are formal (i.e. declared) invocations of user defined logic(s) such as 120. For example, call sites 131-133 may be formal invocations of user defined functions (UDFs). Due to data processing repetition, each call site may be actually invoked many times. For example, call site 133 may have actual invocations such as 141-143.

An actual invocation, such as 141, requires resources such as database object 175. For example, computer system 100 may provide database object 175 to database command 110 for the entire duration of invocation 141. An inefficient implementation may repeat the processing overhead of acquiring database object 175 immediately before each invocation 141-143, and repeat the processing overhead of releasing database object 175 immediately after each invocation 141-143. Techniques herein avoid such high cost by sharing an acquisition of database object 175 amongst multiple invocations of a same user defined logic, such as

120, by repeated invocations 141-143 of a same call site 133, and/or by multiple call sites 132-133 of the same user defined logic 120. For increased efficiency, computer system 100 allocates database object 175 to database command 110 only once, at the beginning of an uninterrupted processing segment, and then releases database object 175 only once at the end of the processing segment. Thus, computer system 100 amortizes the cost of resource allocation overhead over many invocations such as 141-143. Amortization facilitates scaling to process datastore contents having numerous data items, such as with Big Data.

2.3 Lifecycle

Efficient processing of database command 110 may depend on sharing of resources such as database object 175. Such processing entails acquiring and releasing shared resources, which are managed by state machine(s) for maximum efficiency. Each call site 131-133 may have its own state machine to more or less independently manage shared resources. State machines herein have three states, which each state machine instance may visit more or less independently of other state machine instances. The three states are an initial state, an optimized state, and an unready state, such as operational states 151-152, 160, and 170. Each call site's state machine begins in its initial state, such as initial states 151-152. The initial state is the coldest state, in the sense that no shared resources are yet acquired for call site 133 and that computer system 100 must do the most work of any operational state to transition the state machine from the initial state to the optimized state, which is the warmest state because, in the optimized state, the state machine is configured to assume that shared resources needed by call site 133 are already acquired. That assumption avoids the invocation overhead of managing shared resources while call site 133 is in optimized state 160. While in optimized state 160, invocations of call site 133 entail no state change handling and no maintenance of the data structures discussed herein.

For example in operation, computer system 100 may receive and parse database command 110 to detect call sites 131-133 and associate an initial state, such as 151-152, with each call site 131-133. In an embodiment, call sites 131-133 may be more or less immediately (i.e. eagerly) transitioned from initial state to optimized state, such as asynchronously by background processing. In an embodiment, such transitioning may be deferred, such that call sites 131-133 are lazily transitioned from initial state to optimized state upon first invocation of each call site 131-133. For example as shown, call site 133 waits in initial state 152 until first invocation 141 of call site 133, which causes call site 133 to transition just in time from initial state 152 to optimized state 160, which may entail acquiring shared resources, such as database object 175. Whereas, during next invocation 142, call site 133 is already in optimized state 160 and has already acquired needed shared resources. Thus, invocation 142 may be performed more efficiently than invocation 141, because call site 133 is already warmed up and can operate without the overhead of managing shared resources. In a multicore embodiment, a lazy transition may be a low priority unit of work that should be completed no later than upon first invocation 141 and possibly earlier. Mechanisms for implementing operational states and implementing transitions between states are discussed later herein.

2.4 Stalling

In an embodiment, computer system 100 may answer database command 110 by sending a result, such as a result composed of partial results such as 181-182. For example, a client may expect to receive an answer over communication network 190. Bulk data processing, such as for database command 110, may entail stalling that temporarily interrupts processing of database command 110. In order to increase system throughput (e.g. concurrent database commands), processing of database command 110 may entail releasing shared resources, such as database object 175, at the beginning of a stall (i.e. period of idleness), and then reacquiring database object 175 at the end of the stall, which is the beginning of the next processing segment for database command 110. Thus, database command 110 is processed in segments. Depending on the nature of database command 110, processing of database command 110 may entail accumulation (e.g. buffering) of result data items, such as for a result set of a query. Each processing segment may produce a chunk of result data, such as partial results 181-182. For example, each of invocations 141-143 may contribute some data, such as 185, to some partial result, such as 181, although some or all invocations of call sites need not produce any data for incorporation into a partial result. A client and a server of a database may achieve pipeline parallelism during result transmission, which increases system throughput by reducing round trips across communication network 190 or an inter-process boundary. Receiving a result in chunks facilitates incremental processing of the result by the client, which may achieve client performance improvements such as reduced memory consumption, including reduced virtual memory swapping, and reduced apparent latency.

2.5 Resumption

During (or because of) a stall, computer system 100 may flush a buffered partial result. For example, partial result 181 may be flushed from a network buffer by transmitting partial result 181 over communication network 190. Shared resources, such as database object 175, are released at the beginning of a stall and so are not held for database command 110 while a partial result is being transmitted. Thus, processing of database command 110 may transmit a partial result while another database command (not shown) acquires, uses, and (possibly incompatibly) alters shared resource(s). Thus after releasing database object 175, stalling, and then resuming, database command 110 may need to reacquire database object 175 and/or detect whether or not database object 175 was altered (e.g. by another thread or client). However, such shared resource management is not performed when call site 133 is in optimized state 160. Thus when processing of database command 110 releases database object 175 and stalls, the state machine for call site 133 should transition away from optimized state 160, but not to initial state 152.

Initial state 152 should not be revisited because, as discussed later herein, an initial state may be dedicated to performing additional initialization one-time work besides shared resource acquisition. Thus, stalling instead causes call site 133 to transition from optimized state 160 to unready state 170 that indicates that call site 133 was previously initialized but subsequently released its shared objects. In an embodiment, some or all of call sites 131-133 of database command 110 may simultaneously transition from an optimized state to an unready state, as discussed later herein. For example when stalling, execution of database command 110 may release some or all of involved shared resources, including those held for one or more of call sites 131-133. Thus, each call site may have its own state machine instance, which are sometimes independently transitioned between states and other times are transitioned together.

After a stall, processing of database command 110 may eventually resume, and call sites may revisit an optimized state. For example, invocation 143 may cause call site 133 to reacquire database object 175 and transition back to optimized state 160 from unready state 170. Having returned to optimized state 160, invocation 143 may contribute data to next partial result 182 after stalling, whereas earlier invocations such as 141-142 contributed to previous partial result 181.

3.0 Example Call Site Management Process

Figure 2:
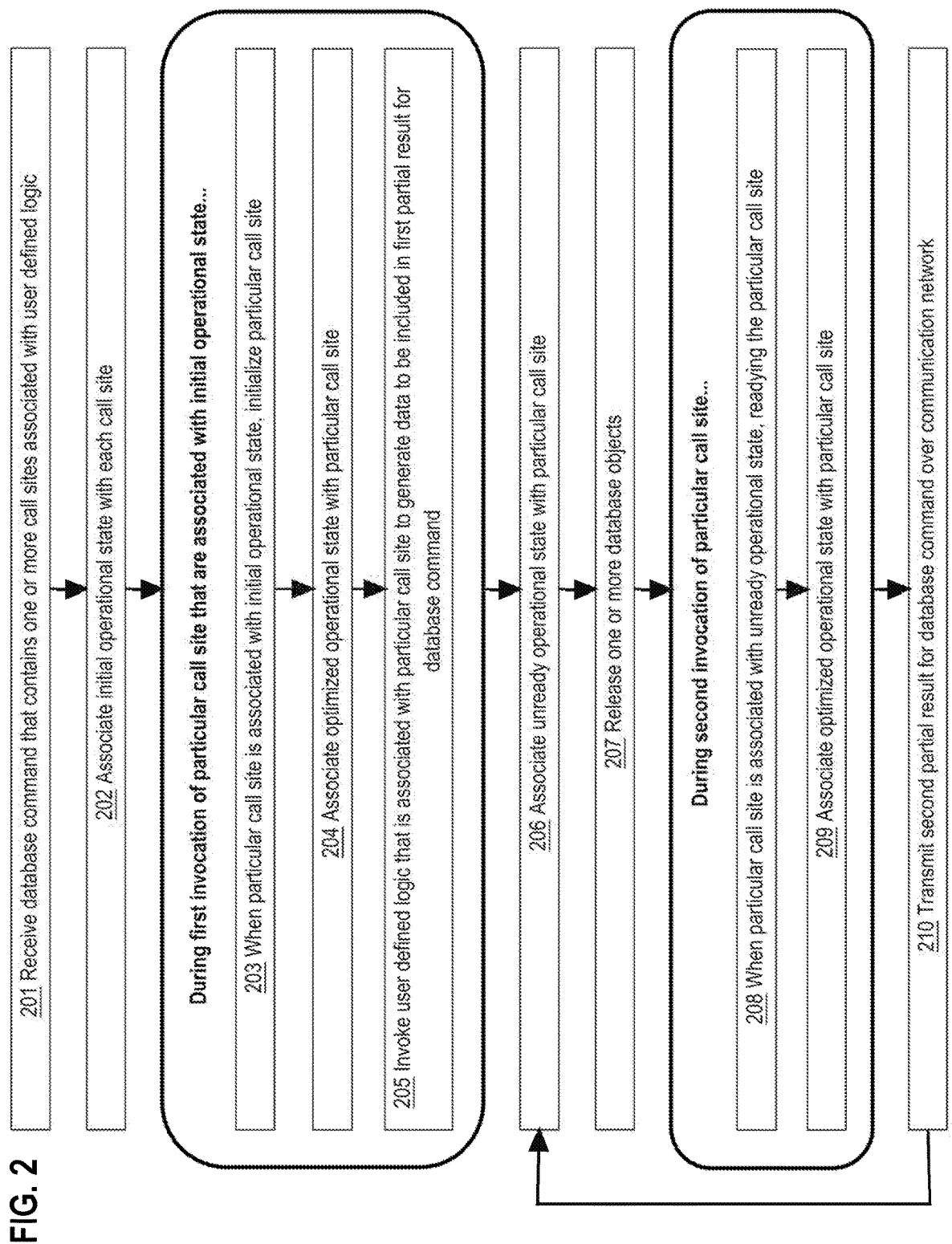
FIG. 2 is a flow diagram that depicts an example process for using a state machine to manage a long-running database command, in an embodiment.

FIG. 2 is a flow diagram that depicts computer system 100 performing an example process for using a state machine to manage a long-running database command, in an embodiment. Thus, FIG. 2 is discussed with reference to FIG. 1.

3.1 Preparation

User defined logic 120 is already defined before execution of database command 110 can begin. User defined logic 120 may have been defined by a previous DDL command such as CREATE FUNCTION. In an Oracle embodiment, function creation may also cause creation of a PL/SQL call specification that describes a typed signature of the function and argument type conversion necessary for invocation of the function from SQL or PL/SQL. In other examples, additional PL/SQL descriptions may be created such as data types for a user-defined aggregations and table functions and packages to encapsulate all user defined extensions. In an embodiment, user defined extensions in source and compiled form and objects that are automatically derived from the user defined extensions are stored or cataloged in a database dictionary.

In an embodiment, SQL such as database command 110 or PL/SQL such as user defined logic 120 is compiled into an intermediate instruction set such as bytecode or portable code (p-code or m-code) that may be directly interpreted, such as by a virtual machine, or cross compiled to native machine code, A DBMS may store database command 110 in a database somewhat redundantly as p-code and a parse tree that may become a graph by semantic analysis. Semantic analysis may detect that call sites 132-133 invoke a same user defined logic 120. Semantic analysis may detect that call sites 132-133 have same or different argument types. The parse tree may be formatted as descriptive intermediate attributed notation for Ada (DIANA). Each of call sites 131-133 may be represented by a separate node of the parse tree. In an embodiment, a parse tree node of a call site may be referenced to determine how to populate and compose query state data structures, such as those of FIGS. 3, 5-6, and 8. Integration of mechanisms herein with infrastructure for parsing and execution of a query is discussed in FIG. 9.

Arbitrarily later after function creation, database command 110 may be received and executed as follows. Steps 201-202 are preparatory and may occur when database command 110 is received. In step 201, a database command is received that contains one or more call sites associated with a user defined logic. For example, computer system 100 may receive database command 110, such as a query, that includes call sites 132-133 that specify invocations of user defined logic 120, such as a user defined function (UDF). Computer system 100 may parse database command 110 into a parse tree that contains call sites 131-133 as nodes. Based on the parse tree, a query plan may be constructed that specifies a detailed execution of database command 110.

In an embodiment, database command 110 is processed by a row source generator (not shown). The row source generator is software that receives an optimal execution plan from an optimizer and produces an iterative execution plan that is usable by the rest of the DBMS. The iterative plan is a binary program that, when executed by the SQL engine, produces a result set. The plan takes the form of a combination of steps. Each step returns a row set. The next step either uses the rows in this set, or the last step returns the rows to the application issuing the SQL statement. Row processing integration is discussed in more detail later herein.

In step 202, an initial operational state is associated with each call site. For example, call sites 132-133 are associated with respective initial states 151-152. Each operational state may have its own invocation handler and/or call stub that is specialized to manage that state and any associated state transition and mediates with underlying user defined logic 120.

After step 202, actual data retrieval according to the query plan may begin. However, the techniques described herein entail some lazy initialization. For example, user defined logic 120 may still need compilation. Steps 203-204 finish lazy initialization on a per call site basis. For example, lazy initialization may occur for call site 133 without occurring for other call sites 131-132. However, work product from lazy initialization of one call site may be reused for related call sites as follows.

Steps 203-205 occur during a first invocation of a particular call site that is in the initial state. For example, execution of database command 110 may cause call site 133 to be invoked for a first time, such as invocation 141. In step 203, the particular call site is initialized, such as call site 133. For example, user defined logic 120 may be compiled and/or registered or stored in a database dictionary as compiled and/or as source code. Functionality of a database dictionary is discussed in more detail later herein. For example, database process(es) that facilitate the execution of a user session may retrieve the source and/or binary of user defined logic 120 from a database dictionary on demand, and may perform runtime compilation to compile/specialize the code for a module that contains user defined logic 120. The executable (i.e. compiled) representation of the module may be cached by session process(es).

Although call site 132 is not being initialized, eventual initialization of call site 132 may be accelerated because user defined logic 120 will already be compiled and registered. During step 203, shared database objects, such as 175, and accompanying locks are acquired. For example, user defined logic 120 may be locked to prevent redefinition of user defined logic 120 by concurrent execution of a different database command. Locking is discussed in more detail later herein.

3.2 Streamlining

After step 203, lazy initialization of call site 133 is complete. In step 204, the particular call site is associated with the optimized state. For example, call site 133 is transitioned from initial state 152 to optimized state 160. Optimized state 160 may directly dispatch the ongoing first invocation 141 of call site 133 to a compiled version of user defined logic 120. For example, optimized state 160 may have a handle or function pointer that facilitates direct invocation of user defined logic 120 with little or no additional overhead. After step 204, call site 133 is fully initialized for streamlined invocation. That may be important because call site 133 may be repeatedly invoked in tight succession, such as once for each row within one or more database blocks that are loaded into memory.

In step 205 the user defined logic is actually invoked, and data is generated to be included in a first partial result of the database command. For example, invocation 141 may cause user defined logic 120 to dynamically contribute data 185 to partial result 181. Step 205 may be more or less immediately repeated for other invocations of call site 133, such as invocations 142-143. For example, invocations 141-143 may each process a separate row of a table. With each invocation, partial result 181 may grow due to accumulation of additional data that the invocations contribute. Eventually partial result 181 may become full, such as when a transmission buffer becomes saturated, such as when invocation 143 contributes more data to partial result 181. At that time, network buffer flushing to a remote client may occur over communication network 190, which may entail significant latency during which shared resources should not be monopolized while execution of database command 110 more or less stalls.

3.3 Suspension

Steps 206-207 entail suspending database command 110 during a significant stall, such as input/output (I/O) waiting, such as during network or disk activity within the critical path of database command 110's execution. For example, redundant array of independent disks (RAID) resilvering or solid state drive (SSD) wear cycling may cause execution of database command 110 to stall. In an embodiment, stalling may occur that is unrelated to an invocation of a call site, but is still suitable for techniques herein. In step 206, the particular call site transitions from the optimized state to an unready state that is suited for stalling. For example after invocation 143, call site 133 transitions from optimized state 160 to unready state 170. In step 207, shared database objects are released. For example, locks and other shared resources held in support of database command 110 are released. If execution of other database commands or activities are waiting (e.g. blocked) on acquiring those resources, then they may acquire them at this time.

After step 207, execution of database command 110 pauses before step 208. The duration of the pause between steps 207-208 may be more or less unpredictable. For example, related network backpressure or unrelated network weather may cause volatility in stall durations. Likewise during that pause, the workload of other commands and the demand for shared resources may be more or less unpredictable. Other ongoing database commands and activities may continue to execute. New database commands may be received and executed. While execution of database command 110 is paused, new or ongoing activity may acquire and/or modify shared resources that were released in step 207. Problematic interference by other commands or activities is discussed later herein.

3.4 Resumption

Eventually, the underlying cause of stalling ceases (e.g. buffer flushing finishes), and execution of database command 110 resumes, which may immediately or eventually cause call site 133 to be invoked again, which is shown as second invocation in FIG. 2. Although designated as second invocation, any number of invocations of call site 133 may have already occurred since the first invocation. Shown second invocation may be any invocation occurring after the first invocation, and not necessarily occurring second. What is important is that the second invocation occurs while call site 133 is in unready state 170. Call site 133 should be reconditioned for its latest invocation, which entails steps 208-209.

In step 208, the particular call site is readied for invocation again. For example, shared objects and accompanying locks are reacquired in support of call site 133. In step 209, the particular site regains the optimized state. For example, call site 133 transitions from unready state 170 back to optimized state 160, which configures call site 133 for streamlined invocation. At this time, the invocation of call site 133 that caused step 208 is actually dispatched to user defined logic 120. Having regained optimized state 160, call site 133 may be repeatedly invoked with little or no overhead. Eventually, execution of database command 110 stalls again or finishes executing. In either case, step 210 may occur that sends another partial result over the communication network. For example, partial result 182 is flushed over communication network 190. If database command 110 has finished executing, all of its shared resources may be released without further processing. However if execution of database command 110 is merely flushing (and pausing) with more execution pending, then execution of database command 110 returns to step 206 to prepare for pausing. Steps 206-210 may be repeated in that way for as many pauses as execution of database command 110 experiences. Although partial results 181-182 are transmitted during respective pauses in this example, in other examples pausing and the associated processing described herein may occur without sending anything, such as when pausing is not due to transmission buffer overflow.

4.0 Example State Machine Implementation

Figure 3:
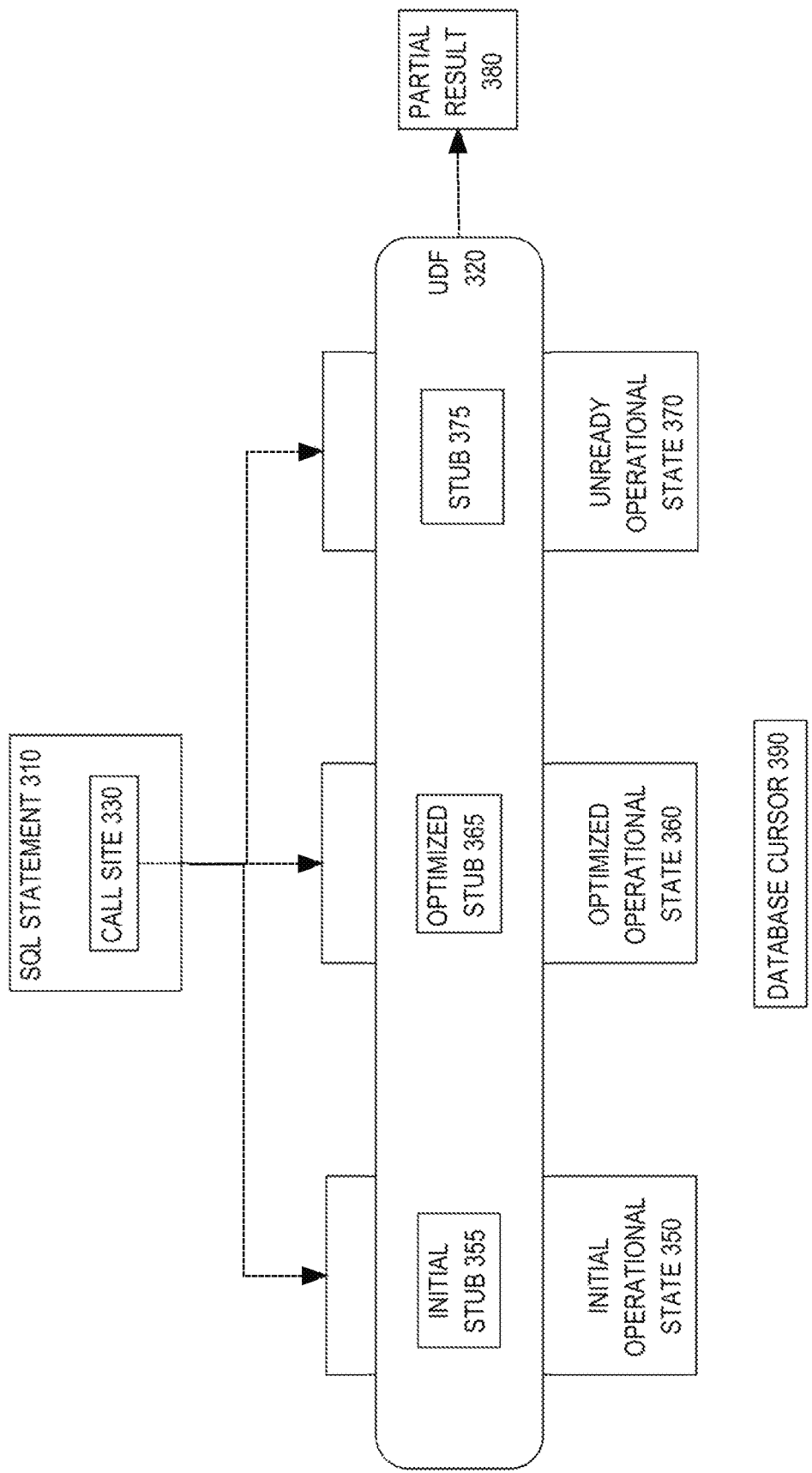
FIG. 3 is a block diagram that depicts an example computer that implements each operational state with a respective subroutine stub to completely avoid management overhead of shared resources while a call site is warm, in an embodiment.

FIG. 3 is a block diagram that depicts an example computer 300, in an embodiment. Computer 300 implements each operational state with a respective subroutine stub to completely avoid management overhead of shared resources while a call site is warm. Computer 300 may implement part or all of computer system 100. Although not shown, computer 300 includes a relational database management system (RDBMS).

In operation, computer 300 receives standard query language (SQL) statement 310 that contains call site(s) such as 330. Call site 330 indicates a formal invocation of user defined function (320). UDF 320 may or may not be expressed in SQL, which is the same language in which statement 310 is expressed, or a dialect of SQL such as PL/SQL. For example, the RDBMS may include an extension engine such as an integrated interpreter of extension scripts that are expressed in a scripting language such as Python or JavaScript, a data language such as R or pig, a general purpose programing language such as Java, or interpretable bytecode such as for Java. UDF 320 may instead be machine language object code such as from a linkable archive.

4.1 Binding Stub

Call site 330 begins in initial state 350. During execution of SQL statement 310, call site 330 may transition between operational states 350, 360, and 370. Each operational state 350, 360, and 370 has an interpretable (e.g. scripted or bytecoded) or machine language subroutine stub, thunk, or wrapper subroutine, such as 355, 365, or 375, that is configured to perform or avoid shared resource management and other overhead during an invocation of call site 330. Each of stubs 355, 365, and 375 has behaviorally distinct logic. Despite such distinctiveness, each of stubs 355, 365, and 375 ultimately invokes UDF 320 as expected for SQL statement 310.

In an embodiment, each call site, such as 330, may have a pointer or array offset to a stub, such as 355, that corresponds to the current state of the call site. For example, call site 330 is initially associated with initial state 350 and may initially have a pointer or array index that refers to initial stub 355. Thus with minimal indirection, a first invocation of call site 330 may traverse a pointer or an array to find and invoke initial stub 355. Minimal indirection may facilitate processor optimizations such as subroutine inlining and branch prediction, as well as avoid overhead such as bus/memory wait state(s), instruction or data pipeline bubbles/stalls, and/or instruction or data cache thrashing.

4.2 Polyglot Optimization

When call site 330 is first invoked, initial stub 355 may perform one-time preparation such as: a) compiling UDF 320 from a high level language (e.g. Java, JavaScript, python, C, BASIC) into intermediate code or machine instructions, and b) instantiating other stubs 365 and 375 for other operational states 360 and 370. Compiling may or may not include linking and/or loading of functions or other objects. Initial stub 355 also: a) acquires shared objects (not shown), b) transitions the state machine of call site 330 to optimized state 360, and c) directly (or indirectly through optimized stub 365) invokes UDF 320. Initial stub 355 may transition the state machine to the optimized state by switching a function pointer (not shown) that is associated with call site 330 to point to optimized stub 365 and no longer point to initial stub 355. In an embodiment, such a state transition is accomplished by adjusting an offset into an array of stubs to indicate the offset of the array element that stores optimized stub 365 and no longer indicate the offset of initial stub 355 within that array (not shown). According to a lifecycle of call site 330 that reacts to the beginning and finishing of stalling while processing SQL statement 310, call site 330 may always be associated with a contextually appropriate operational state and corresponding stub.

Optimized stub 365 is streamlined to avoid all overhead associated with shared resource management and state transitioning. Operation of optimized stub 365 may be limited to directly invoking UDF 320. Repeated invocations of call site 330 may cause repeated invocations of optimized stub 365 that may cause repeated invocations of UDF 320, which may eventually be recognized as an execution hotspot by an execution profiler such as a bytecode interpreter. For example, a just in time (JIT) bytecode compiler may decide to remove or inline optimized stub 365, such that call site 330 may eventually switch to directly invoking UDF 320 while call site 330 is in optimized state 360.

When processing of SQL statement 310 stalls, computer 300 may release shared objects and associate call site 330 with unready state 370 and stub 375. When processing of SQL statement 310 resumes, call site 330 and stub 375 may be invoked, which causes reacquisition of shared objects and another invocation of UDF 320. In an embodiment, initial stub 365 performs initialization and then automatically transitions to unready state 370 and invokes stub 375. In an embodiment, stub 375 acquires shared objects and then automatically transitions to optimized state 360 and invokes optimized stub 365 that finally invokes UDF 320. Ultimately, each invocation of call site 330 causes another invocation of UDF 320, each of which may or may not contribute data to a partial result such as 380.

5.0 Resource Coordination

Figure 4:
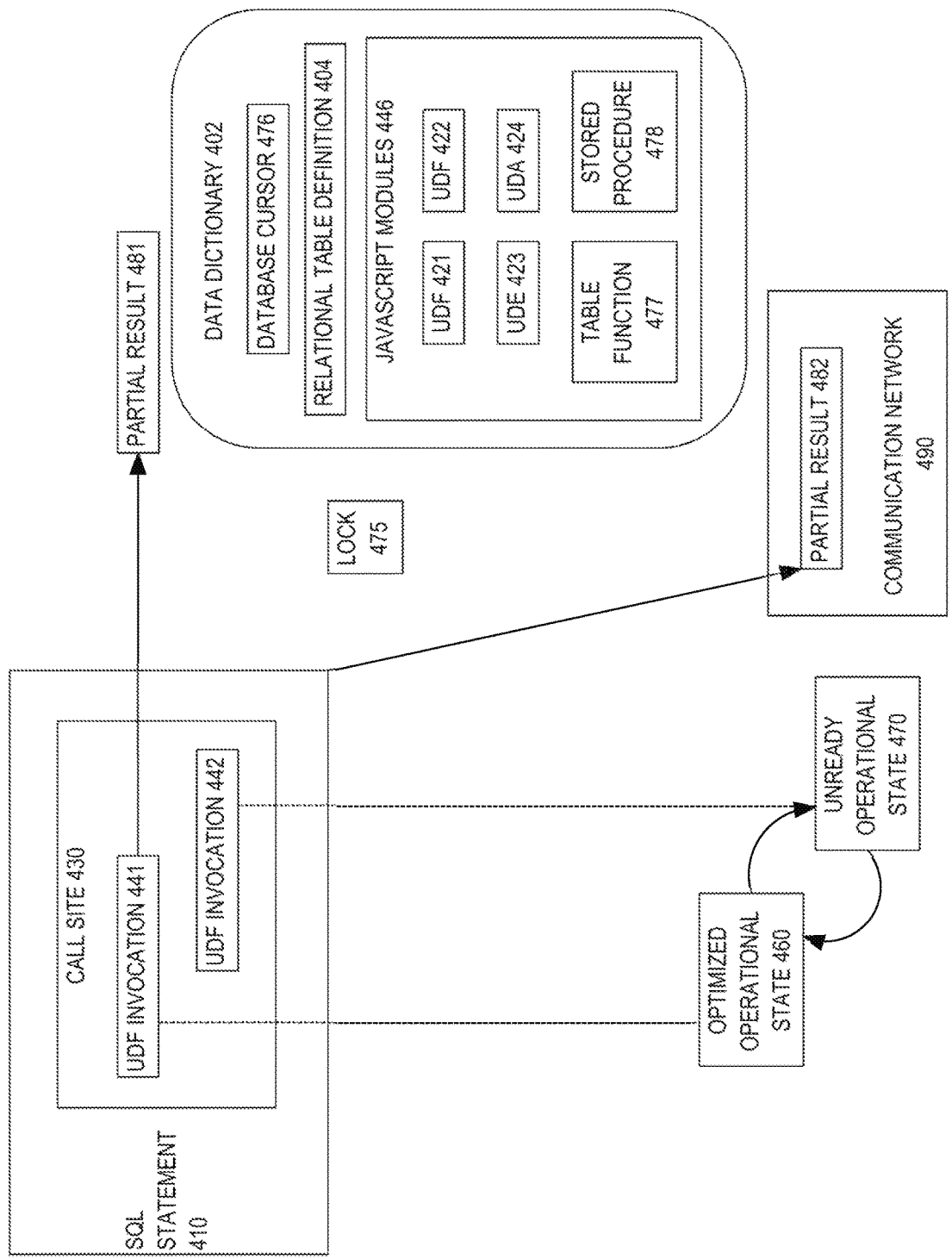
FIG. 4 is a block diagram that depicts an example computer that has a lock with level(s) of mutual exclusion for logic modification during contentious use, in an embodiment.

FIG. 4 is a block diagram that depicts an example computer 400, in an embodiment. Computer 400 has a lock with level(s) of mutual exclusion for logic modification during contentious use. Computer 400 may implement part or all of computer system 100.

Execution of SQL statement 410 may occasionally pause and occasionally resume, which respectively entails acquiring or releasing shared objects. Those objects may be more or less simultaneously shared for executions of different SQL statements. Some SQL statements may modify shared objects in ways that are inconsistent with current uses of those shared objects. Avoidance of downtime, especially for online transaction processing (OLTP), may aggravate such contention, such as when applying a software patch to a production database server that is in service. For example, invocations 441-442 of UDF 421 at call site 430 of SQL statement 410 may occur while another client modifies UDF 421. For example, invocation 441 may occur before UDF 421 is modified, and invocation 442 may occur after modification, in which case, invocations 441-442 may inconsistently yield different results even though identical results may be expected. To prevent such inconsistencies and race conditions, access to shared objects may be coordinated by acquiring/releasing locks, such as 475.

5.1 Pessimistic Locking

Lock 475 may protect and/or be implemented by any of database objects 402, 404, 421-424, or 476-478. Depending on the embodiment, lock 475 may be any of an optimistic transactional lock (e.g. table lock or record lock), a pessimistic or optimistic non-transactional lock (i.e. not ACID), a mutex, a semaphore, a spin lock, or a hardware lock such as an atomic instruction within bytecode or CPU instruction set. In this example, lock 475 protects at least UDF 421, such that UDF 421 should not be invoked without having acquired lock 475. An underlying mechanism of lock 475 may impose significant overhead (i.e. latency) upon an attempt to acquire lock 475. Such overhead may include thread suspension, memory/bus/IO wait states, or spinning. While execution of SQL statement 410 is in optimized state 460, lock 475 is presumed to be already acquired (as a prerequisite to transitioning to optimized state 460), such that invocations such as 441-442 may occur without actually accessing lock 475, thereby avoiding latency. For example, lock 475 need not be a reentrant (i.e. idempotent) lock.

Computer 400 uses lock 475 for pessimistic locking. Lock 475 may allow some acquisitions (e.g. reading) to be concurrent but not others (e.g. writing), such with a shared-exclusive lock, which may increase aggregate throughput. For example, invocation 441 may occur during an initial state (not shown) of call site 430, which may invoke a stub that acquires lock 475 for shared reading and detects whether UDF 421 is not yet compiled before actually invoking UDF 421 or transitioning to optimized state 460. When transitioning from unready state 470 to optimized state 460, lock 475 should be reacquired for reading. Reacquisition may detect versioning of a shared object, which may cause SQL statement 410 to abort. For example, lock 475 may be released after invocation 441 and, before invocation 442, another client may patch (i.e. revise) UDF 421. Afterwards, invocation 442 during unready state 470 may detect such contention and abort.

5.2 Resource Inventory

Various kinds of shared objects may be protected by lock 475, such as database dictionary 402. Within database dictionary 402, individual components may be protected by lock 475, such as database cursor 476, relational table definition 404, and various logic (e.g. JavaScript) modules 446. JavaScript modules 446 may include reusable modules such as custom subroutines that SQL statements may invoke, such as user defined functions (UDFs) 421-422, user defined expression (UDE) 423, user defined aggregation (UDA) 424, table function 477, and stored procedure 478. In some cases where multiple shared objects are needed, one call site may acquire multiple locks.

6.0 Call Site Context and Cursor Sharing

Figure 5:
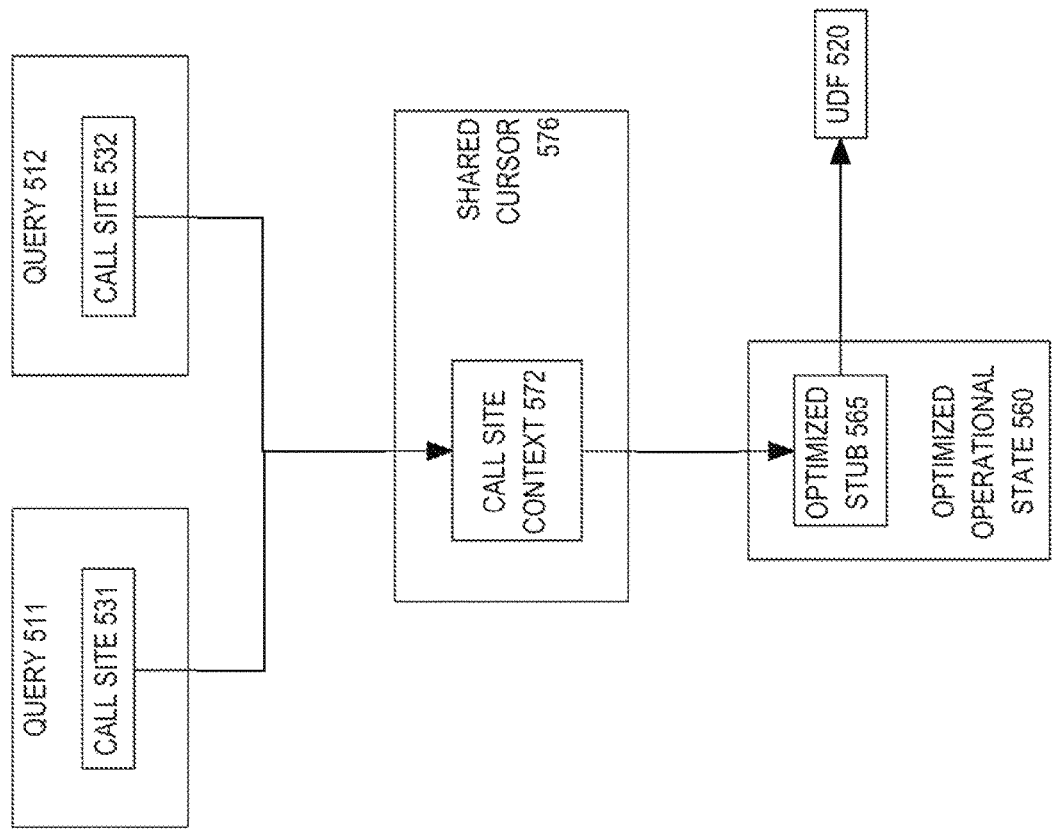
FIG. 5 is a block diagram that depicts an example computer that has a call site context that integrates a call stub into a shared cursor for increased amortization of state transition costs, in an embodiment.

FIG. 5 is a block diagram that depicts an example computer 500, in an embodiment. Computer 500 has a call site context that integrates a call stub into a shared cursor for increased amortization of state transition costs. Computer 500 may implement part or all of computer system 100.

Although queries 511-512 may be submitted in different database sessions for different clients, queries 511-512 may be more or less identical and share a query plan. Consolidation of infrastructure for separately submitted similar queries may be implemented with a shared cursor, such as 576. Database cursor 576 may essentially serve as either a compiled form of, or a context object for, query 511 or 512 or both. Cursor sharing may amortize the cost of cursor creation. Queries 511-512 may have similar call sites 531-532 that invoke same UDF 520 with parameters of similar types. Call sites 531-532 are associated with same call site context 572 to manage the lifecycle (e.g. state transitions) of both call sites 531-532 as if they were a same call site. Thus, shared cursor 576 and its call site context 572 allow similar queries 511-512 to seamlessly share a same optimized state 560 and optimized stub 565 for UDF 520. Even if executions of similar queries 511-512 only partially overlap temporally, operational state 560 may remain active for the temporal union, not the intersection, of execution of queries 511-512. For example, query 512 may benefit from streamlined optimized state 560 without ever experiencing non-optimized operational states, because other query 511 already caused needed state transition(s). In addition to accelerating later query 512, embedding call site context 572 into shared cursor 576 may also accelerate earlier query 511, such as when query 511 finishes but need not release a lock because cursor 576 and call site context 572 are still needed by ongoing query 512. Thus, embedding of call site context 572 within shared cursor 576 may accelerate both of queries 511-512 more than if queries 511-512 did not share a cursor.

7.0 Example Data Structures

Figure 6:
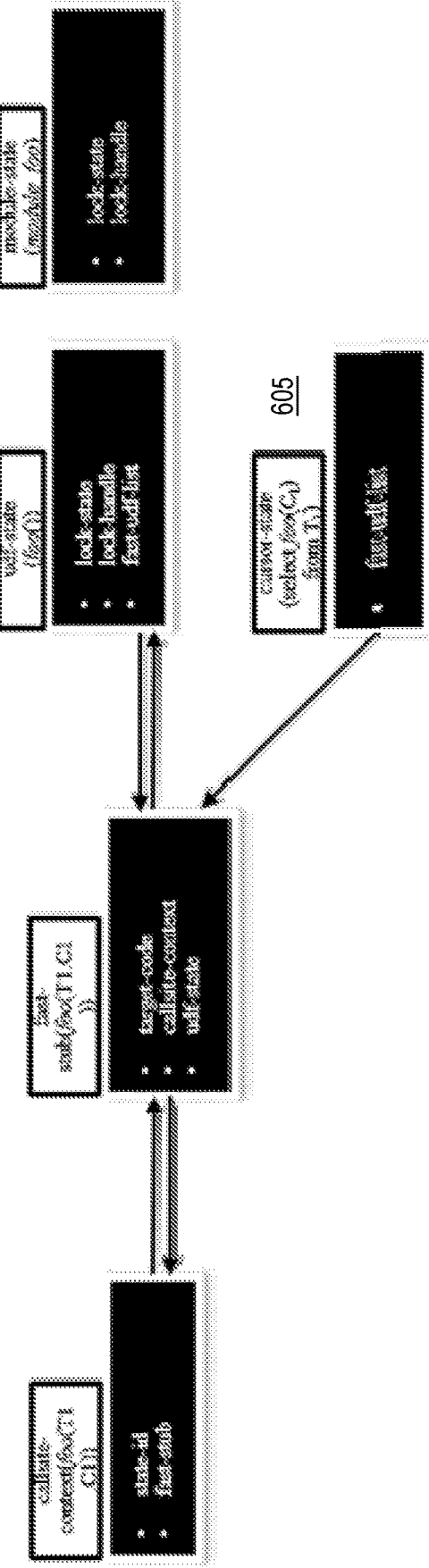
FIG. 6 is a block diagram that depicts an example computer that instructs a particular arrangement of internal data structures to manage a particular query, in an embodiment.

FIG. 6 is a block diagram that depicts an example computer 600, in an embodiment. Computer 600 constructs a particular arrangement of internal data structures to manage a particular query. Computer 600 may implement part or all of computer 100.

Computer 600 receives query 606 and accordingly constructs and configures data structures 601-605 to facilitate execution of query 606. Computer 600 may construct call site context 601 to create and anchor, within a database cursor (not shown), data structures 602-605 that support the use of UDF foo. Computer 600 may manage and track the availability (e.g. loading) of module foo by creating module state 604 that has its own lock. Module foo may contain multiple user defined subroutines, such as UDF foo, for which udf-states, such as 603, may be created to manage and track the readiness (e.g. compiling) of UDF foo. Fast-stub 602 may be created to streamline actual invocations of UDF foo. Fast-stub 602 may cache a compiled instance of UDF foo that may or may not be optimized for particular actual argument types for UDF foo's formal arguments. Associated with the database cursor is cursor-state 605 that may contain a reference (e.g. pointer) to fast-stub 602.

FIG. 6 depicts a constellation of related logical data structures. Directed arrows shown between data structures indicate directed associations, such as a reference, a pointer, or actual nesting containment. The behavior of computer 600, including the use of those data structures for row processing during query execution, is discussed in detail with FIG. 7 as follows.

8.0 Example Query Execution Process

Figure 7:
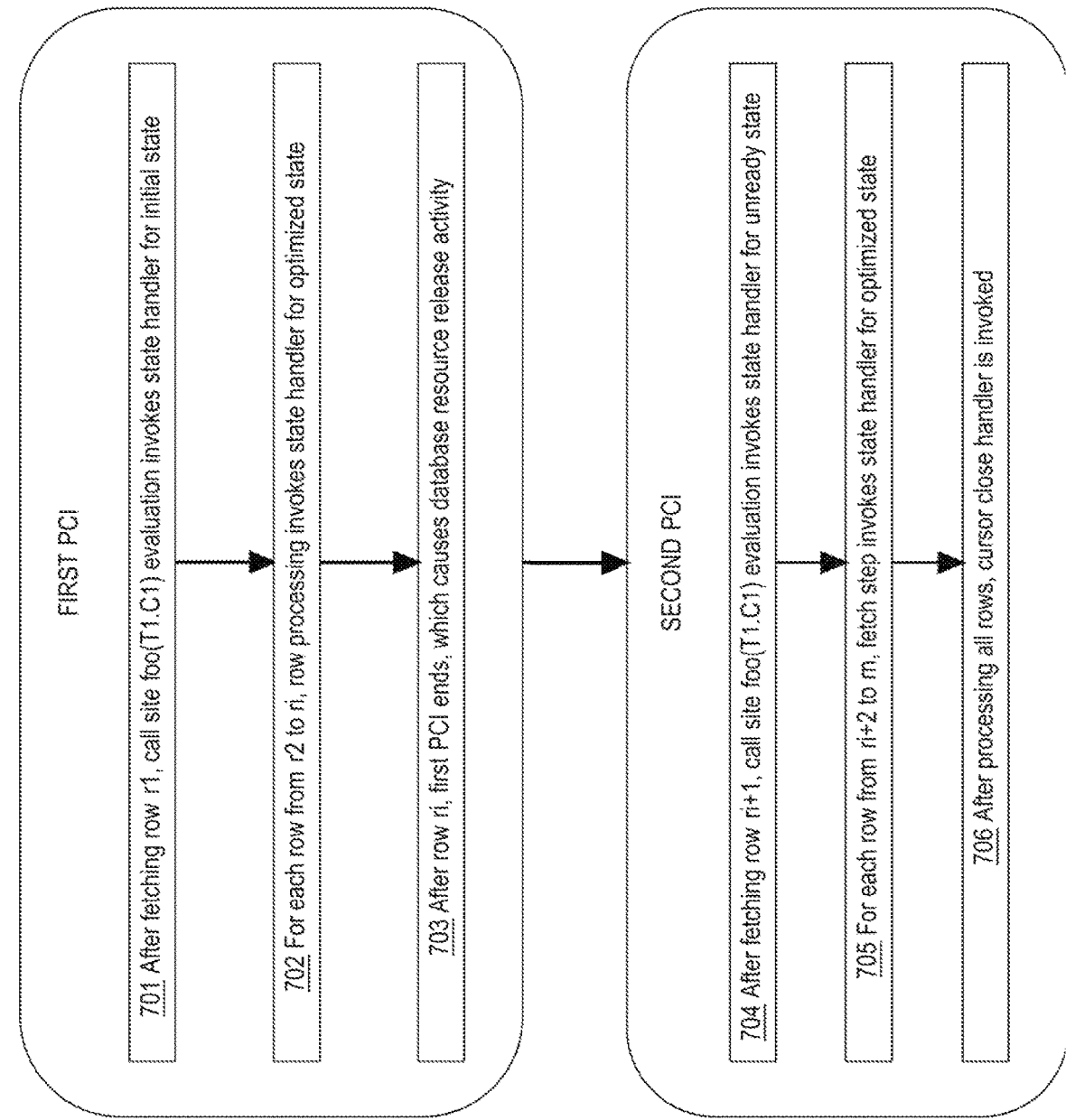
FIG. 7 is a flow diagram that depicts an example process for row processing during query execution, in an embodiment.

FIG. 7 is a flow diagram that depicts computer system 100 performing an example process for row processing during query execution, in an embodiment. FIG. 7 is discussed with reference to FIG. 6.

Steps 701-706 depict example activity for execution of an example query, during which an example call site progresses through a lifecycle of operational states. Step 701 occurs while the call site is in its initial state. In preparatory step 701, a call site is invoked for a first retrieved row, which includes invoking a state handler (e.g. stub) for the initial state. For example, T1 may be a table of rows (i.e. database records) from which a first row r1 is retrieved. For example, computer 600 may load a disk block into memory that contains rows of table T1, including first row r1. The initial state handler is then invoked, which may perform the following example sequence of preparatory activities:

a. Check for state change on database object module foo. If state is valid, acquire read lock protection on module_joo, and store handle in module-state 604.

b. Check for state change on database objectfoo( ). If state is valid, acquire read lock protection on foo( ) and store handle in udf-state object 603.

c. Check for state of query's shared cursor (not shown in FIG. 6). State will be valid if schema of table T1 or column C1 is unchanged.

d. Create cursor-state 605 for ongoing shared cursor instance.

e. Compile user defined logic in module_foo if programming language specific compilation is required. Store generated code in shared-stub object (not shown in FIG. 6).

f. Create fast-stub 602, and populate it with generated code in shared-stub, reference to call site-context 601, and udf-state 603.

g. Store reference to newly created fast-stub 602 in cursor-state 605, and udf-state 603.

h. Update operational state-id in call site-context 601 to indicate optimized state.

i. Invoke user defined logic (i.e., generated code) against input row r1 data.

Fast-stub 602 is associated with the optimized state. Thus after step 701, the call site is in the optimized state, such that processing subsequent rows will be streamlined. In step 702, subsequent rows r2 through ri are each processed by the optimized state handler. That may or may not entail loading additional disk blocks into memory that contain additional rows of table T1. For each row, the optimized state handler is invoked, which may perform the following example sequence of activities for each row:

a. Access fast-stub 602 present in call site-context 601.

b. Invoke user defined logic (i.e., generated code in fast-stub 602) against input row data.

Steps 701-703 represent a first program call interface (PCI), which is the processing of a chunk (i.e. subset) of rows until a stall occurs. Eventually query execution pauses, perhaps to flush a network buffer to a client. Step 703 concludes the first PCI. In step 703, the end of the first PCI causes activity that releases database resources. Locks on database objects foo( ) and module_foo are released during step 703. Lock release on foo( ) object invokes a lock handler (not shown in FIG. 6), which may perform the following example sequence of activities:

a. Access udf-state 603 corresponding to foo( ).

b. Obtain reference to call site-context 601 using fast-udf reference in udf-state 603.

c. Update state-id in call site-context 601 to unready state.

After step 703, the call site is in the unready state, such that essentially no locks are held. An indefinite stall, brief or long, separates the first PCI from a second PCI during execution of query 606. Steps 704-706 represent the second PCI, which is the resumption of executing query 606, including more row processing. In step 704, resumption overhead occurs. During step 704, the call site is invoked for a next retrieved row ri+1, which includes invoking a state handler for the unready state, which may perform the following example sequence of resuming activities:

a. Check for state change on database object module joo. If state is valid, acquire read lock protection on module_foo, and store handle in module-state 604.
b. Check for state change on database objectfoo( ). If state is valid, acquire read lock protection on foo( ) and store handle in udf-state 603.
c. Check for state of query 606's shared cursor. State will be valid if schema of table T1 or column C1 is unchanged.
d. Obtain reference to call site-context 601 using fast-udf reference in udf-state 603.
e. Update state-id in call site-context 601 to optimized state.
f. Invoke user defined logic (i.e., generated code) against input row ri+1 data.

After step 704, the call site is revisiting the optimized state. Processing by step 705 is essentially the same as step 702, except that rows ri+2 to rn are involved (i.e. a different chunk of rows). In this example, rn is the last row for query 606, which means that the second PCI is the last PCI. At the end of the last PCI, step 706 a close handler of the cursor is invoked, which may perform the following example sequence of closing activities:
a. Access cursor-state 605 of ongoing shared cursor instance.
b. Obtain reference to udf-state 603 using fast-udf reference in cursor-state 605.
c. Remove fast-udf reference in udf-state 603.
d. Remove fast-udf reference in cursor-state 605.
e. Deallocate fast-udf reference.

9.0 Row Processing

Figure 8:
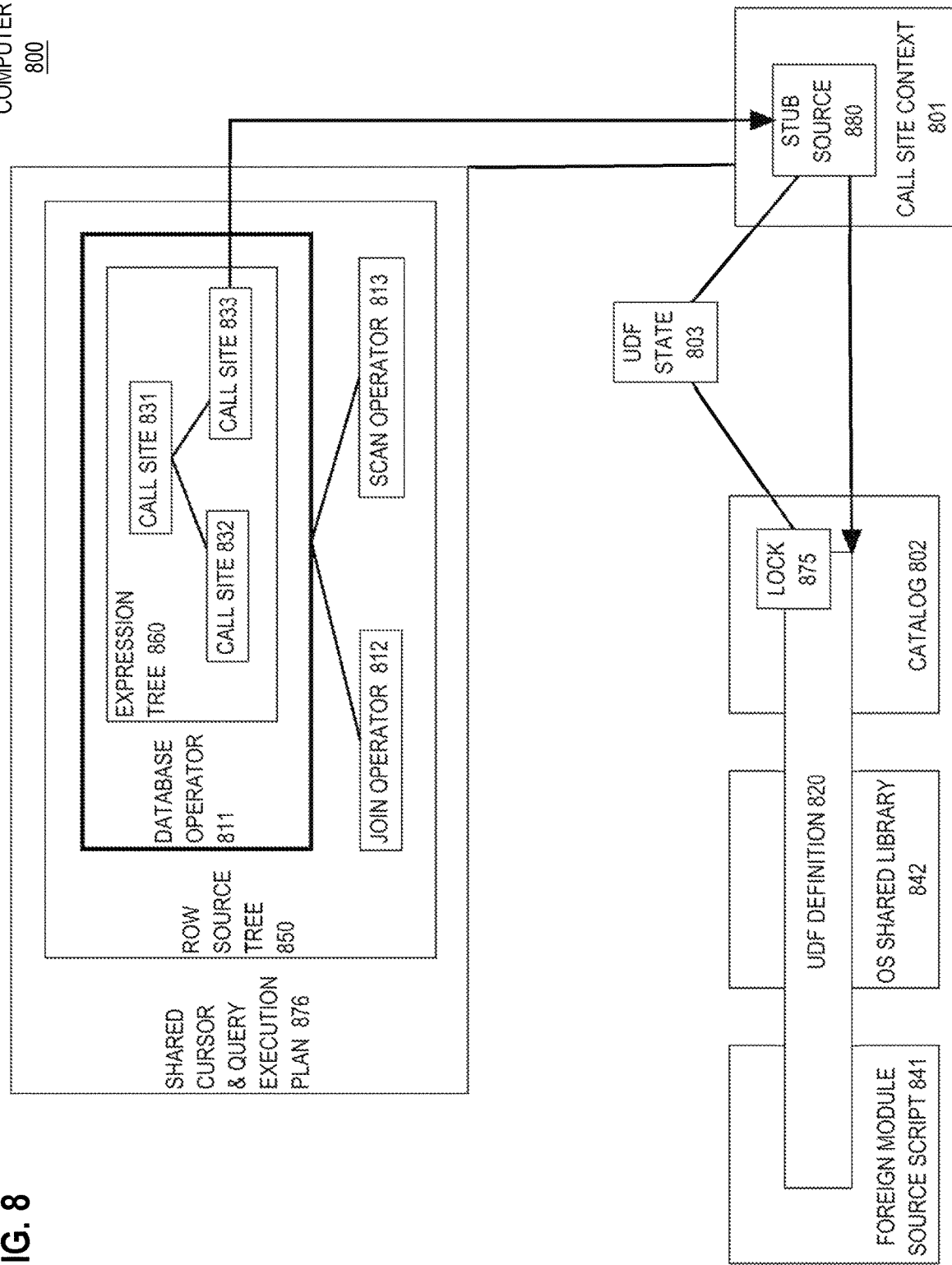
FIG. 8 is a block diagram that depicts an example computer that consolidates operational state management of multiple call sites of a query and subquery into call site groups, in an embodiment.

FIG. 8 is a block diagram that depicts an example computer 800, in an embodiment. Computer 800 embeds state management within row processing infrastructure. Computer 800 may be an implementation of computer system 100.

Separation of concerns occurs in FIG. 8 as follows. Shared cursor and query execution plan 876 encapsulates important row processing infrastructure that can actually execute a query upon a store or stream of tuples, such as table rows. Cursor and plan 876 may be implemented as a cursor object that is somewhat separate from a query plan object, although shown as a same object. For example, the cursor and the plan may be stored as separately retrievable objects in catalog 802 (e.g. a database dictionary) or in separate stores, such as one in catalog 802 and the other in a shared pool (not shown). In an embodiment, the execution plan is directly shareable between repeated submissions of an identical query. In an embodiment, the shared execution plan is a template that must be instantiated for each instance of an identical query.

Execution plan 876 contains row source tree 850 that configures a flow of tuples (e.g. rows) through a processing pipeline to achieve the operations of the query. Rows flow upwards from the bottom to the top of row source tree 850. For example, scan operator 813 may read rows from a table and feed the rows to database operator 811. In an embodiment, scan operator 813 may perform filtration and/or projection. Join operator 812 may receive rows from other scan or join operators (not shown). Some nodes may have complex configurable behaviors, such as database operator 811 whose logic is encoded as expression tree 860. For example, expression tree 860 may implement a complex (e.g. ad hoc) expression that has call sites 831-833, such as MAX(FOO (constant),BAR(row.column)), such that BAR is defined as UDF definition 820. Trees 850 and 860 may be syntax trees or other meaningful graphs that are automatically constructed, such as by a query parser.

Construction of call site context 801 may more or less simultaneously occur with construction of call site 833 by the query parser. Call site 833 has a reference to catalog 802 that stores UDF definition 820. Due to its deployment lifecycle, UDF 820 takes various forms in various stores as follows. Original (e.g. handcrafted) foreign source (e.g. JavaScript) 841 may be an original textual definition such as a text file, script, or other body of text. A DBMS (not shown) may build (e.g. compile) a binary definition of UDF 820 that is inserted into operating-system (OS) shared library 842 that is a code archive file such as a dynamically linked library (DLL). Text and/or binary versions of UDF 820 may be stored or listed in catalog 802.

Because UDF 820 is a foreign function, call site 833 is augmented with a source representation (i.e., textual form) for a stub necessary to call the foreign function. Stub source 880 may contain instructions for a binding (i.e. glue code) for calling foreign UDF 820 and for performing conversion operations between database types and foreign language types for input and output parameters and a return value. Depending on the nature of the foreign language, the DBMS may also compile stub source 880.

Because objects in catalog 802 may be shared and possibly modified by multiple concurrent processes, query execution may use locks, such as 875, to track cataloged object(s) as needed and be notified of changes. State objects, such as 801 and 803, are data structures that keep track of catalog objects used and the locks maintained on them. State objects are created and associated with shared cursors, such as 876, with objects (e.g., a PL/SQL package) holding the definition of UDFs, or with each call site 831-833.

A database may contain information on data structures corresponding to runtime states, like process, session, or a call to the database interface within a session (i.e. PCI). For a given query execution, a state object (not shown) may be dedicated to tracking the lifecycle of a PCI, to be informed of its activity (e.g. active or inactive) and lifespan (i.e., when query execution ends).

On a first call to foreign function 820, when call site context 801 is associated with a UDF state 803 that represents an initial state, stub source 880 is constructed that contains code generated from the source representation of the stub. Depending on the embodiment, a reference to source stub 880 (or as compiled) may be stored in call site context 801 (as shown) or call site 833 or both. For example if call site context 801 is in an optimized state, then call site 833 may directly invoke UDF 820 without necessarily involving objects 803 and 875. Thus, execution plan 876 may repeatedly directly invoke UDF 820 during a computational burst.

10.0 Grouping

Figure 9:
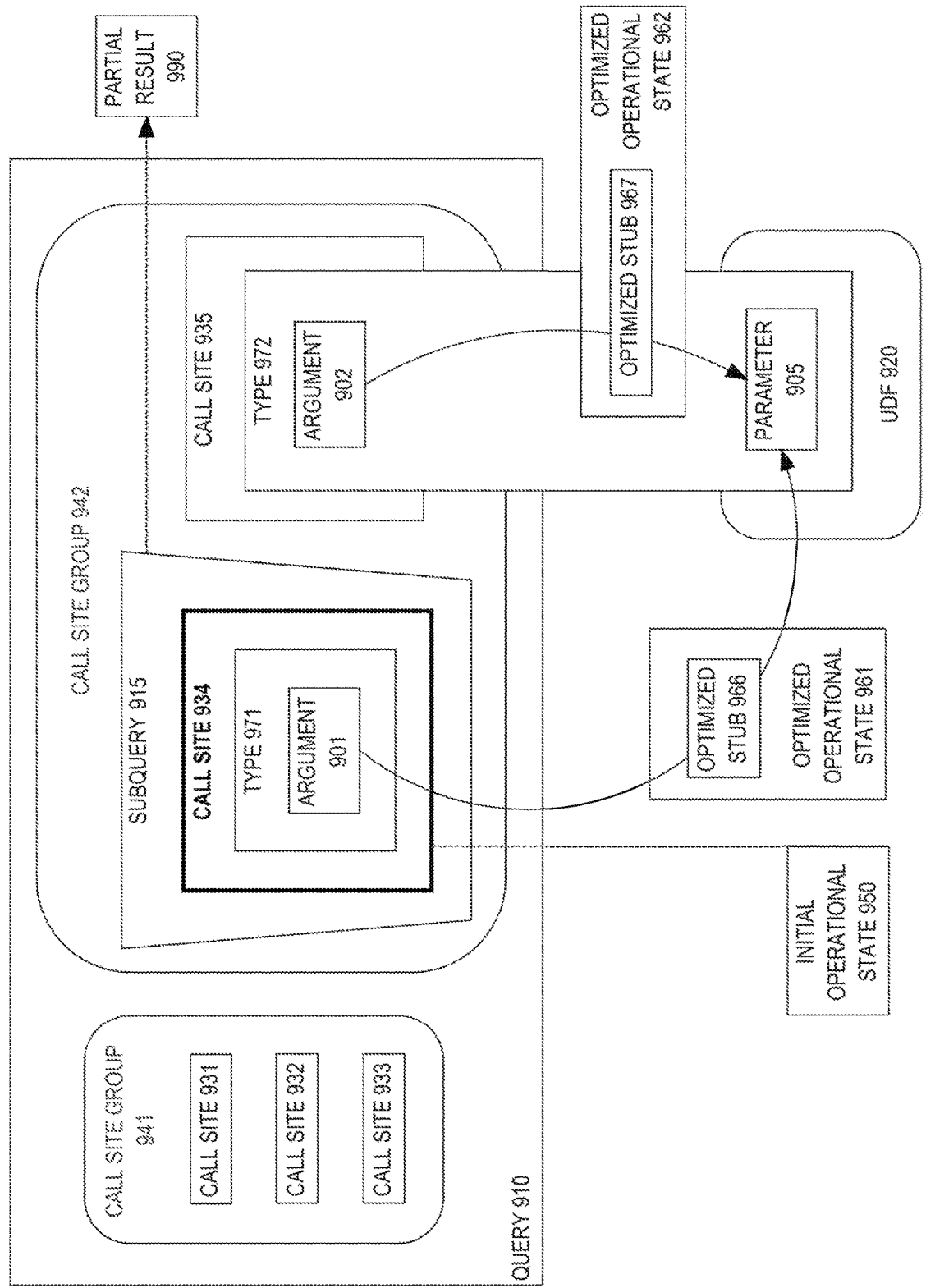
FIG. 9 is a block diagram that depicts an example computer that embeds state management within row processing infrastructure, in an embodiment.

FIG. 9 is a block diagram that depicts an example computer 900, in an embodiment. Computer 900 consolidates operational state management of multiple call sites of a query and subquery into call site groups. Computer 900 may be an implementation of computer system 100.

In an embodiment, each call site may have its own operational state management overhead. For example, handlers for call sites 931-933 may independently acquire a same read lock for a same shared object, with each acquisition incurring its own cost. Those costs are potentially redundant and may be consolidated into a shared handler that is associated with a call site group, such as 941. With call site group 941, redundant lock acquisition costs may be coalesced into a single acquisition having a single cost that may be amortized between all of call sites 931-933, thereby eliminating a marginal cost for each call site in the group. On or before invocation of any one of call sites 931-933, the handler of call site group 941 may execute to acquire a lock (not shown) and hold the lock for as long as any of call sites 931-933 may be invoked during a same PCI. A consequence of grouping may be that call sites 931-933 are transitioned to a next operational state together. For example when call site group 941 locks the shared object, group 941's handler also transitions all of call sites 931-933 into an optimized state. Likewise at the end of a PCI, call site group 941 may release the lock(s) and transition all of call sites 931-933 into an unready state.

In an embodiment not shown, call site groups may form a hierarchy. For example, call sites that depend on shared object AA may be members of call site group A; call sites that depend on shared object BB may be members of call site group B; and call sites that depend on both AA and BB may be members of call site group C that also has call site groups A and B as members.

Query 910 contains call site 935 and subquery 915, which contains call site 934. The lifecycle of query 910 and subquery 915 may be somewhat separate. For example, query 910 may continue executing after subquery 915 finishes. However, such incompletely overlapping lifecycles need not prevent call sites 934-935 from being members of same call site group 942. So long as call sites 934-935 share an object, such as UDF 920 that call sites 934-935 invoke, call sites 934-935 may both be members of call site group 942 and benefit from consolidated/amortized resource acquisition. As members of same call site group 942, call sites 934-935 undergo the same lifecycle transitions at the same time. For example, call site 934 may linger in optimized state 961 even after subquery 915 finishes (and perhaps providing partial result 990), because query 910 is not finished, which may necessarily keep call site 935 in optimized state 962.

Although not shown, call site 931 may depend on first multiple shared objects, and call site 934 may depend on second multiple shared objects, with first and second multiple shared objects partially overlapping (i.e. having some but not all shared object in common). In that case of partial overlap of dependencies, call sites 931 and 934 are not put in a same call site group.

Even though call sites 934-935 reside in same call site group 942, transition together to and from same operational states, and invoke same UDF 920, call sites 934-935 need not share a same stub. For example, call sites 934-935 have respective optimized stubs 966-967, which are different. Different stubs may implement different treatment of arguments that are injected into a same parameter of a same UDF. For example, call sites 934-935 both invoke UDF 920, but with different respective arguments 901-902. Argument 902 is of data type 972, which is the same type as parameter 905 of UDF 920. Thus, argument 902 may be passed as parameter 905 without needing type conversion. Indeed, optimized stub 967 does not perform conversion. Whereas, argument 901 is of data type 971, which is different from type 972 that parameter 905 expects. Optimized stub 966 is specialized to perform a conversion from type 971 to 972 so that argument 901 may be passed into UDF 920 as parameter 905.

11.0 Database Overview

Embodiments of the present invention are used in the context of database management systems (DBMSs). Therefore, a description of an example DBMS is provided.

Generally, a server, such as a database server, is a combination of integrated software components and an allocation of computational resources, such as memory, a node, and processes on the node for executing the integrated software components, where the combination of the software and computational resources are dedicated to providing a particular type of function on behalf of clients of the server. A database server governs and facilitates access to a particular database, processing requests by clients to access the database.

Users interact with a database server of a DBMS by submitting to the database server commands that cause the database server to perform operations on data stored in a database. A user may be one or more applications running on a client computer that interact with a database server. Multiple users may also be referred to herein collectively as a user.

A database comprises data and a database dictionary that is stored on a persistent memory mechanism, such as a set of hard disks. A database is defined by its own separate database dictionary. A database dictionary comprises metadata that defines database objects contained in a database. In effect, a database dictionary defines much of a database. Database objects include tables, table columns, and tablespaces. A tablespace is a set of one or more files that are used to store the data for various types of database objects, such as a table. If data for a database object is stored in a tablespace, a database dictionary maps a database object to one or more tablespaces that hold the data for the database object.

A database dictionary is referred to by a DBMS to determine how to execute database commands submitted to a DBMS. Database commands can access the database objects that are defined by the dictionary.

A database command may be in the form of a database statement. For the database server to process the database statements, the database statements must conform to a database language supported by the database server. One non-limiting example of a database language that is supported by many database servers is SQL, including proprietary forms of SQL supported by such database servers as Oracle, (e.g. Oracle Database 11g). SQL data definition language ("DDL") instructions are issued to a database server to create or configure database objects, such as tables, views, or complex types. Data manipulation language ("DML") instructions are issued to a DBMS to manage data stored within a database structure. For instance, SELECT, INSERT, UPDATE, and DELETE are common examples of DML instructions found in some SQL implementations. SQL/WL is a common extension of SQL used when manipulating XML data in an object-relational database.

A multi-node database management system is made up of interconnected nodes that share access to the same database. Typically, the nodes are interconnected via a network and share access, in varying degrees, to shared storage, e.g. shared access to a set of disk drives and data blocks stored thereon. The nodes in a multi-node database system may be in the form of a group of computers (e.g. work stations, personal computers) that are interconnected via a network. Alternately, the nodes may be the nodes of a grid, which is composed of nodes in the form of server blades interconnected with other server blades on a rack.

Each node in a multi-node database system hosts a database server. A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients.

Resources from multiple nodes in a multi-node database system can be allocated to running a particular database server's software. Each combination of the software and allocation of resources from a node is a server that is referred to herein as a "server instance" or "instance". A database server may comprise multiple database instances, some or all of which are running on separate computers, including separate server blades.

11.1 Query Processing

A query is an expression, command, or set of commands that, when executed, causes a server to perform one or more operations on a set of data. A query may specify source data object(s), such as table(s), column(s), view(s), or snapshot(s), from which result set(s) are to be determined. For example, the source data object(s) may appear in a FROM clause of a Structured Query Language ("SQL") query. SQL is a well-known example language for querying database objects. As used herein, the term "query" is used to refer to any form of representing a query, including a query in the form of a database statement and any data structure used for internal query representation. The term "table" refers to any source object that is referenced or defined by a query and that represents a set of rows, such as a database table, view, or an inline query block, such as an inline view or subquery.

The query may perform operations on data from the source data object(s) on a row by-row basis as the object(s) are loaded or on the entire source data object(s) after the object(s) have been loaded. A result set generated by some operation(s) may be made available to other operation(s), and, in this manner, the result set may be filtered out or narrowed based on some criteria, and/or joined or combined with other result set(s) and/or other source data object(s).

A subquery is a portion or component of a query that is distinct from other portion(s) or component(s) of the query and that may be evaluated separately (i.e., as a separate query) from the other portion(s) or component(s) of the query. The other portion(s) or component(s) of the query may form an outer query, which may or may not include other subqueries. A subquery nested in the outer query may be separately evaluated one or more times while a result is computed for the outer query.

Generally, a query parser receives a query statement and generates an internal query representation of the query statement. Typically, the internal query representation is a set of interlinked data structures that represent various components and structures of a query statement.

The internal query representation may be in the form of a graph of nodes, each interlinked data structure corresponding to a node and to a component of the represented query statement. The internal representation is typically generated in memory for evaluation, manipulation, and transformation.

12.0 Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 10:
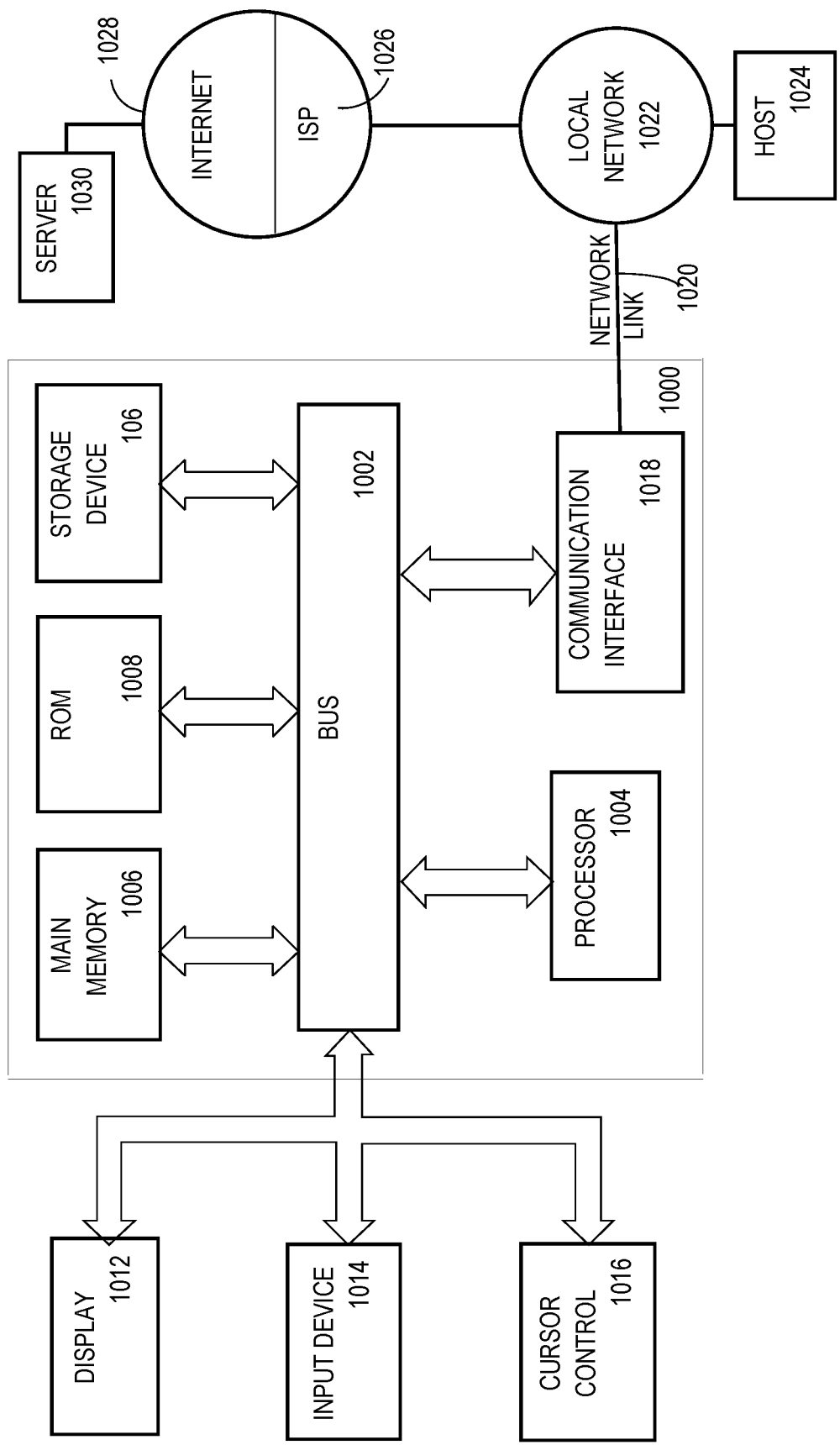
FIG. 10 is a block diagram that illustrates a computer system upon which an embodiment of the invention may be implemented.

For example, FIG. 10 is a block diagram that illustrates a computer system 1000 upon which an embodiment of the invention may be implemented. Computer system 1000 includes a bus 1002 or other communication mechanism for communicating information, and a hardware processor 1004 coupled with bus 1002 for processing information. Hardware processor 1004 may be, for example, a general purpose microprocessor.

Computer system 1000 also includes a main memory 1006, such as a random access memory (RAM) or other dynamic storage device, coupled to bus 1002 for storing information and instructions to be executed by processor 1004. Main memory 1006 also may be used for storing temporary variables or other intermediate information during execution of instructions to be executed by processor 1004. Such instructions, when stored in non-transitory storage media accessible to processor 1004, render computer system 1000 into a special-purpose machine that is customized to perform the operations specified in the instructions.

Computer system 1000 further includes a read only memory (ROM) 1008 or other static storage device coupled to bus 1002 for storing static information and instructions for processor 1004. A storage device 106, such as a magnetic disk or optical disk, is provided and coupled to bus 1002 for storing information and instructions.

Computer system 1000 may be coupled via bus 1002 to a display 1012, such as a cathode ray tube (CRT), for displaying information to a computer user. An input device 1014, including alphanumeric and other keys, is coupled to bus 1002 for communicating information and command selections to processor 1004. Another type of user input device is cursor control 1016, such as a mouse, a trackball, or cursor direction keys for communicating direction information and command selections to processor 1004 and for controlling cursor movement on display 1012. This input device typically has two degrees of freedom in two axes, a first axis (e.g., x) and a second axis (e.g., y), that allows the device to specify positions in a plane.

Computer system 1000 may implement the techniques described herein using customized hard-wired logic, one or more ASICs or FPGAs, firmware and/or program logic which in combination with the computer system causes or programs computer system 1000 to be a special-purpose machine. According to one embodiment, the techniques herein are performed by computer system 1000 in response to processor 1004 executing one or more sequences of one or more instructions contained in main memory 1006. Such instructions may be read into main memory 1006 from another storage medium, such as storage device 106. Execution of the sequences of instructions contained in main memory 1006 causes processor 1004 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 106. Volatile media includes dynamic memory, such as main memory 1006. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1002. Transmission media can also take the form of acoustic or light waves, such as those generated during radio-wave and infra-red data communications.

Various forms of media may be involved in carrying one or more sequences of one or more instructions to processor 1004 for execution. For example, the instructions may initially be carried on a magnetic disk or solid state drive of a remote computer. The remote computer can load the instructions into its dynamic memory and send the instructions over a telephone line using a modem. A modem local to computer system 1000 can receive the data on the telephone line and use an infra-red transmitter to convert the data to an infra-red signal. An infra-red detector can receive the data carried in the infra-red signal and appropriate circuitry can place the data on bus 1002. Bus 1002 carries the data to main memory 1006, from which processor 1004 retrieves and executes the instructions. The instructions received by main memory 1006 may optionally be stored on storage device 106 either before or after execution by processor 1004.

Computer system 1000 also includes a communication interface 1018 coupled to bus 1002. Communication interface 1018 provides a two-way data communication coupling to a network link 1020 that is connected to a local network 1022. For example, communication interface 1018 may be an integrated services digital network (ISDN) card, cable modem, satellite modem, or a modem to provide a data communication connection to a corresponding type of telephone line. As another example, communication interface 1018 may be a local area network (LAN) card to provide a data communication connection to a compatible LAN. Wireless links may also be implemented. In any such implementation, communication interface 1018 sends and receives electrical, electromagnetic or optical signals that carry digital data streams representing various types of information.

Network link 1020 typically provides data communication through one or more networks to other data devices. For example, network link 1020 may provide a connection through local network 1022 to a host computer 1024 or to data equipment operated by an Internet Service Provider (ISP) 1026. ISP 1026 in turn provides data communication services through the world wide packet data communication network now commonly referred to as the "Internet" 1028. Local network 1022 and Internet 1028 both use electrical, electromagnetic or optical signals that carry digital data streams. The signals through the various networks and the signals on network link 1020 and through communication interface 1018, which carry the digital data to and from computer system 1000, are example forms of transmission media.

Computer system 1000 can send messages and receive data, including program code, through the network(s), network link 1020 and communication interface 1018. In the Internet example, a server 1030 might transmit a requested code for an application program through Internet 1028, ISP 1026, local network 1022 and communication interface 1018.

The received code may be executed by processor 1004 as it is received, and/or stored in storage device 106, or other non-volatile storage for later execution.

13.0 Software Overview

Figure 11:
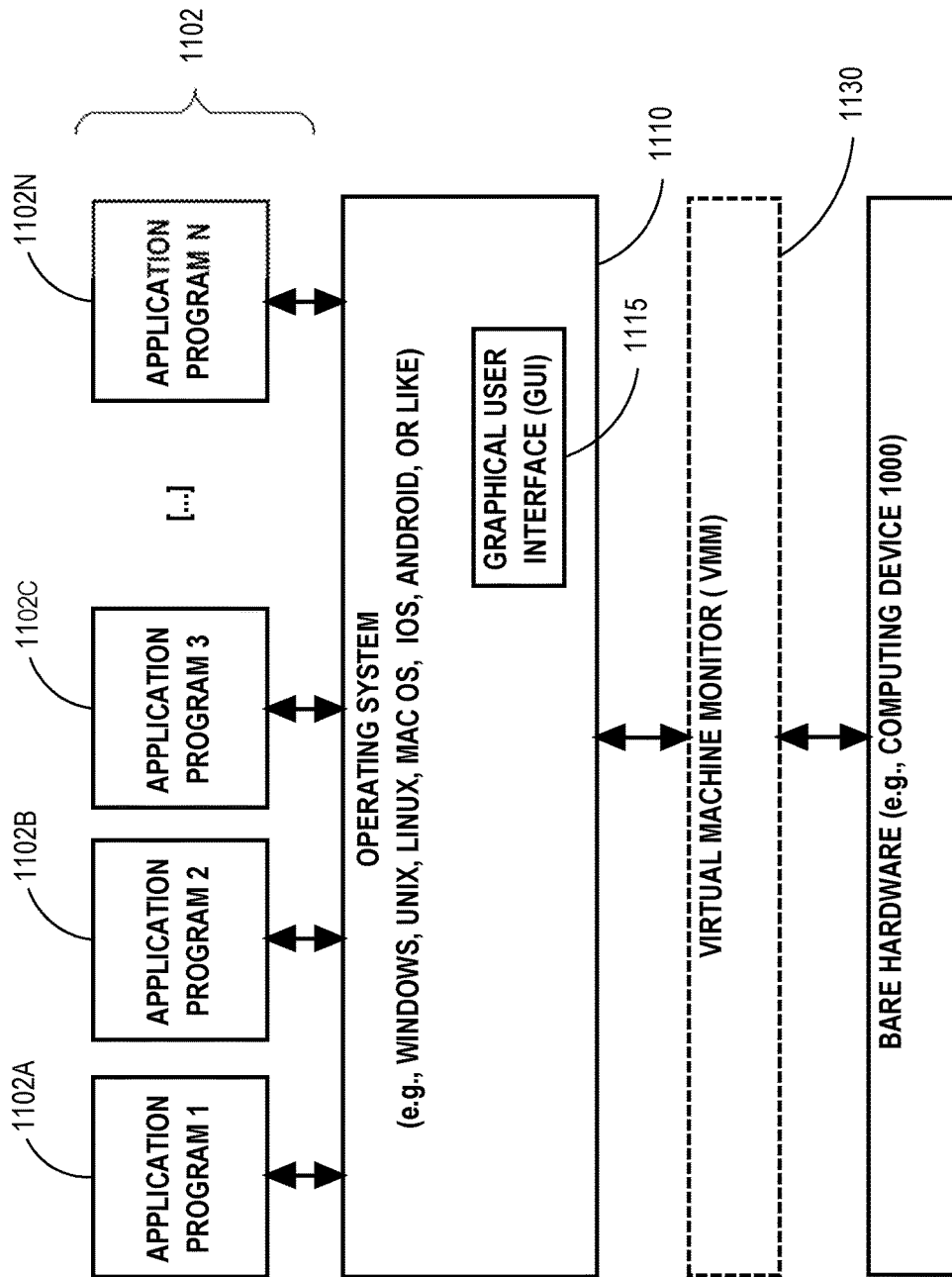
FIG. 11 is a block diagram that illustrates a basic software system that may be employed for controlling the operation of a computing system.

FIG. 11 is a block diagram of a basic software system 1100 that may be employed for controlling the operation of computing system 1000. Software system 1100 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 1100 is provided for directing the operation of computing system 1000. Software system 1100, which may be stored in system memory (RAM) 1006 and on fixed storage (e.g., hard disk or flash memory) 106, includes a kernel or operating system (OS) 1110.

The OS 1110 manages low-level aspects of computer operation, including managing execution of processes, memory allocation, file input and output (I/O), and device I/O. One or more application programs, represented as 1102A, 1102B, 1102C . . . 1102N, may be "loaded" (e.g., transferred from fixed storage 106 into memory 1006) for execution by the system 1100. The applications or other software intended for use on computer system 1000 may also be stored as a set of downloadable computer-executable instructions, for example, for downloading and installation from an Internet location (e.g., a Web server, an app store, or other online service).

Software system 1100 includes a graphical user interface (GUI) 1115, for receiving user commands and data in a graphical (e.g., "point-and-click" or "touch gesture") fashion. These inputs, in turn, may be acted upon by the system 1100 in accordance with instructions from operating system 1110 and/or application(s) 1102. The GUI 1115 also serves to display the results of operation from the OS 1110 and application(s) 1102, whereupon the user may supply additional inputs or terminate the session (e.g., log off).

OS 1110 can execute directly on the bare hardware 1120 (e.g., processor(s) 1004) of computer system 1000. Alternatively, a hypervisor or virtual machine monitor (VMM) 1130 may be interposed between the bare hardware 1120 and the OS 1110. In this configuration, VMM 1130 acts as a software "cushion" or virtualization layer between the OS 1110 and the bare hardware 1120 of the computer system 1000.

VMM 1130 instantiates and runs one or more virtual machine instances ("guest machines"). Each guest machine comprises a "guest" operating system, such as OS 1110, and one or more applications, such as application(s) 1102, designed to execute on the guest operating system. The VMM 1130 presents the guest operating systems with a virtual operating platform and manages the execution of the guest operating systems.

In some instances, the VMM 1130 may allow a guest operating system to run as if it is running on the bare hardware 1120 of computer system 1100 directly. In these instances, the same version of the guest operating system configured to execute on the bare hardware 1120 directly may also execute on VMM 1130 without modification or reconfiguration. In other words, VMM 1130 may provide full hardware and CPU virtualization to a guest operating system in some instances.

In other instances, a guest operating system may be specially designed or configured to execute on VMM 1130 for efficiency. In these instances, the guest operating system is "aware" that it executes on a virtual machine monitor. In other words, VMM 1130 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

14.0 Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprise two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure and applications.

The above-described basic computer hardware and software and cloud computing environment presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
receiving a database command that contains one or more call sites, wherein each call site of the one or more call sites is associated with a user defined logic;
executing the database command that contains the one or more call sites by:
a) associating an initial operational state with each call site of the one or more call sites;
b) during a first invocation of a particular call site of the one or more call sites that are associated with the initial operational state:
when the particular call site is associated with the initial operational state, initializing the particular call site;
associating an optimized operational state with the particular call site, and
invoking the user defined logic that is associated with the particular call site to generate data to be included in a first partial result for the database command;
c) associating an unready operational state with the particular call site;
d) releasing one or more database objects that were acquired for said executing the database command;
e) during a second invocation of the particular call site:
when the particular call site is associated with the unready operational state, readying the particular call site, and
associating the optimized operational state with the particular call site;
f) transmitting a second partial result for the database command over a communication network;
wherein the method is performed by one or more computers.

2. The method of claim 1 wherein:
initializing the particular call site comprises locking the one or more database objects;

releasing the one or more database objects comprises unlocking the one or more database objects;
readying the particular call site comprises locking the one or more database objects.

3. The method of claim 2 wherein:
locking the one or more database objects comprises acquiring a lock;
the method further comprises, during a third invocation of the particular call site when the particular call site is associated with the optimized operational state, invoking the user defined logic that is associated with the particular call site without accessing the lock.

4. The method of claim 2 wherein the locking the one or more database objects comprises acquiring a lock that is not a transactional lock.

5. The method of claim 2 wherein locking one or more database objects comprises locking two or more selected from the group consisting of: a database dictionary, a database cursor, a relational table definition, the user defined logic that is associated with the particular call site, and a module that contains a plurality of user defined logics.

6. The method of claim 1 wherein initializing the particular call site comprises compiling the user defined logic that is associated with the particular call site.

7. The method of claim 1 wherein initializing the particular call site comprises storing, as at least one selected from the group consisting of source code and compiled code, the user defined logic that is associated with the particular call site in a database dictionary.

8. The method of claim 1 wherein:
initializing the particular call site comprises acquiring a shared-exclusive lock for reading;
readying the particular call site comprises reacquiring the shared-exclusive lock for reading.

9. The method of claim 1 wherein the database command is expressed in a language that is different than the user defined logic that is associated with at least one of the one or more call sites.

10. The method of claim 1 further comprising, after releasing the one or more database objects, transmitting the first partial result over a communication network.

11. The method of claim 1 wherein the user defined logic that is associated with at least one of the one or more call sites comprises at least one selected from the group consisting of: a user defined expression, a user defined aggregation, a table function, and a stored procedure.

12. The method of claim 1 wherein:
the database command contains a subquery;
generate data to be included in the first partial result for the database command comprises generate the first partial result for the subquery.

13. The method of claim 1 wherein:
associating the initial operational state with each call site comprises associating with the call site an initial stub that performs:
said initializing the call site;
said associating the optimized operational state with the call site; and
said invoking the user defined logic that is associated with the particular call site to generate data to be included in the first partial result for the database command;
associating the optimized operational state with the particular call site comprises associating with the particular call site an optimized stub that invokes the user defined logic that is associated with the particular call site;
associating the unready operational state with the particular call site comprises associating with the particular call site a stub that performs:
said readying the particular call site; and
said associating the optimized operational state with the particular call site.

14. The method of claim 13 further comprising deleting the optimized stub when a database cursor closes.

15. The method of claim 1 wherein:
the particular call site specifies an argument having a first type;
the user defined logic expects a parameter having a second type;
associating the optimized operational state with the particular call site comprises associating with the particular call site an optimized stub that converts a value from the first type to the second type.

16. The method of claim 1 wherein:
associating an initial operational state with each call site comprises:
detecting that the particular call site and a second call site of the one or more call sites are associated with a same user defined logic;
adding the particular call site and the second call site to a call site group;
readying the particular call site comprises readying each call site of the call site group.

17. The method of claim 16 wherein:
the database command contains a subquery;
the subquery contains the second call site but not the particular call site.

18. The method of claim 1 wherein:
readying the particular call site comprises failing the database command if a database object of the one or more database objects has changed since said invoking the user defined logic that is associated with the particular call site;
the database object comprises at least one selected from the group consisting of: a database dictionary, a database cursor, a relational table definition, the user defined logic that is associated with the particular call site, and a module that contains a plurality of user defined logics.

19. The method of claim 1 wherein:
the particular call site specifies an argument having a first type;
associating the optimized operational state with the particular call site comprises associating with the particular call site a first optimized stub that depends on the first type;
the one or more call sites contains a second call site that is associated with same said user defined logic;
the second call site specifies an argument having a second type;
the method further comprises, in response to detecting that the first type and second type are different, associating with the second call site a second optimized stub that depends on the second type.

20. The method of claim 1 wherein:
said particular call site is associated with a call site context that refers to the optimized operational state when said particular call site is associated with the optimized operational state;
a database cursor contains the call site context.

21. The method of claim 20 wherein refers to the optimized operational state comprises refers to an optimized stub that invokes the user defined logic that is associated with the particular call site.

22. The method of claim 20 wherein the database cursor is simultaneously shared by the database command and a second database command.

23. The method of Claim 1 wherein said executing the database command that contains the one or more call sites comprises transmitting a second partial result for the database command over a communication network.

24. One or more non-transitory computer-readable media storing instructions that, when executed by one or more processors, cause:
  receiving a database command that contains one or more call sites, wherein each call site of the one or more call sites is associated with a user defined logic;
  executing the database command that contains the one or more call sites by:
    a) associating an initial operational state with each call site of the one or more call sites;
    b) during a first invocation of a particular call site of the one or more call sites that are associated with the initial operational state:
      when the particular call site is associated with the initial operational state, initializing the particular call site;
      associating an optimized operational state with the particular call site, and
      invoking the user defined logic that is associated with the particular call site to generate data to be included in a first partial result for the database command;
    c) associating an unready operational state with the particular call site;
    d) releasing one or more database objects that were acquired for said executing the database command;
    e) during a second invocation of the particular call site:
      when the particular call site is associated with the unready operational state, readying the particular call site, and
      associating the optimized operational state with the particular call site;
    f) transmitting a second partial result for the database command over a communication network.

25. The one or more non-transitory computer-readable media of claim 24 wherein:
  initializing the particular call site comprises locking the one or more database objects;
  releasing the one or more database objects comprises unlocking the one or more database objects;
  readying the particular call site comprises locking the one or more database objects.

26. The one or more non-transitory computer-readable media of claim 24 wherein initializing the particular call site comprises compiling the user defined logic that is associated with the particular call site.

27. The one or more non-transitory computer-readable media of claim 24 wherein initializing the particular call site comprises storing, as at least one selected from the group consisting of source code and compiled code, the user defined logic that is associated with the particular call site in a database dictionary.

28. The one or more non-transitory computer-readable media of claim 24 wherein:
  initializing the particular call site comprises acquiring a shared-exclusive lock for reading;
  readying the particular call site comprises reacquiring the shared-exclusive lock for reading.

29. The one or more non-transitory computer-readable media of claim 24 wherein the database command is expressed in a language that is different than the user defined logic that is associated with at least one of the one or more call sites.

30. The one or more non-transitory computer-readable media of claim 24 wherein the instructions further cause, after releasing the one or more database objects, transmitting the first partial result over a communication network.

31. The one or more non-transitory computer-readable media of claim 24 wherein the user defined logic that is associated with at least one of the one or more call sites comprises at least one selected from the group consisting of: a user defined expression, a user defined aggregation, a table function, and a stored procedure.

32. The one or more non-transitory computer-readable media of claim 24 wherein:
  the database command contains a subquery;
  generate data to be included in the first partial result for the database command comprises generate the first partial result for the subquery.

33. The one or more non-transitory computer-readable media of claim 24 wherein:
  associating the initial operational state with each call site comprises associating with the call site an initial stub that is configured to perform:
    said initializing the call site;
    said associating the optimized operational state with the call site; and
    said invoking the user defined logic that is associated with the particular call site to generate data to be included in the first partial result for the database command;
  associating the optimized operational state with the particular call site comprises associating with the particular call site an optimized stub that invokes the user defined logic that is associated with the particular call site;
  associating the unready operational state with the particular call site comprises associating with the particular call site a stub that is configured to perform:
    said readying the particular call site; and
    said associating the optimized operational state with the particular call site.

34. The one or more non-transitory computer-readable media of claim 24 wherein:
  the particular call site specifies an argument having a first type;
  the user defined logic expects a parameter having a second type;
  associating the optimized operational state with the particular call site comprises associating with the particular call site an optimized stub that converts a value from the first type to the second type.

35. The one or more non-transitory computer-readable media of claim 24 wherein:
  associating an initial operational state with each call site comprises:
    detecting that the particular call site and a second call site of the one or more call sites are associated with a same user defined logic;
    adding the particular call site and the second call site to a call site group;
  readying the particular call site comprises readying each call site of the call site group.

36. The one or more non-transitory computer-readable media of claim 24 wherein:
- readying the particular call site comprises failing the database command if a database object of the one or more database objects has changed since said invoking the user defined logic that is associated with the particular call site;
- the database object comprises at least one selected from the group consisting of: a database dictionary, a database cursor, a relational table definition, the user defined logic that is associated with the particular call site, and a module that contains a plurality of user defined logics.

37. The one or more non-transitory computer-readable media of claim 24 wherein:
- the particular call site specifies an argument having a first type;
- associating the optimized operational state with the particular call site comprises associating with the particular call site a first optimized stub that depends on the first type;
- the one or more call sites contains a second call site that is associated with same said user defined logic;
- the second call site specifies an argument having a second type;
- the instructions further cause, in response to detecting that the first type and second type are different, associating with the second call site a second optimized stub that depends on the second type.

38. The one or more non-transitory computer-readable media of claim 24 wherein:
- said particular call site is associated with a call site context that refers to the optimized operational state when said particular call site is associated with the optimized operational state;
- a database cursor contains the call site context.

\* \* \* \* \*

UNITED STATES PATENT AND TRADEMARK OFFICE
CERTIFICATE OF CORRECTION

PATENT NO. : 10,990,594 B2
APPLICATION NO. : 15/971664
DATED : April 27, 2021
INVENTOR(S) : Kandukuri et al.

It is certified that error appears in the above-identified patent and that said Letters Patent is hereby corrected as shown below:

On the Title Page

On page 2, Column 1, Item (56) under Other Publications, Line 4, delete "Multngual" and insert -- Multilingual --, therefor.

In the Specification

In Column 14, Line 8, delete "module foo." and insert -- module_foo. --, therefor.

In Column 14, Line 12, delete "foo( )" and insert -- foo( ), --, therefor.

In Column 15, Line 5, delete "foo( )" and insert -- foo( ), --, therefor.

In Column 18, Line 50, delete "SQL/WL" and insert -- SQL/XML --, therefor.

In the Claims

In Column 24, Lines 61-62, in Claim 1, below "site;" delete "f) transmitting a second partial result for the database command over a communication network;".

In Column 27, Lines 43-45, in Claim 24, delete "site; f) transmitting a second partial result for the database command over a communication network." and insert -- site. --, therefor.

Signed and Sealed this
Seventeenth Day of August, 2021

Drew Hirshfeld
*Performing the Functions and Duties of the*
*Under Secretary of Commerce for Intellectual Property and*
*Director of the United States Patent and Trademark Office*